US011729025B2

(12) United States Patent
Paruchuri et al.

(10) Patent No.: US 11,729,025 B2
(45) **Date of Patent: *Aug. 15, 2023**

(54) ESTABLISHING A NETWORK MICRO-TUNNEL WITHIN A NETWORK TUNNEL

(71) Applicant: Juniper Networks, Inc., Sunnyvale, CA (US)

(72) Inventors: Vijay Sai Ram Paruchuri, Bangalore (IN); Goutham Kondapavuluru, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,686

(22) Filed: Apr. 26, 2022

(65) Prior Publication Data

US 2022/0255771 A1 Aug. 11, 2022

Related U.S. Application Data

(63) Continuation of application No. 16/829,700, filed on Mar. 25, 2020, now Pat. No. 11,323,290.

(51) Int. Cl.
*H04L 12/46* (2006.01)
*H04L 47/2441* (2022.01)
(Continued)

(52) U.S. Cl.
CPC ...... *H04L 12/4633* (2013.01); *H04L 47/2441* (2013.01); *H04L 47/2483* (2013.01);
(Continued)

(58) Field of Classification Search
None
See application file for complete search history.

(56) References Cited

U.S. PATENT DOCUMENTS 11,323,290 B2 5/2022 Paruchuri et al.
11,461,123 B1 * 10/2022 Tsai .................... G06F 9/45558
(Continued)

FOREIGN PATENT DOCUMENTS

EP 1976196 A1 10/2008
WO 2004036849 A2 4/2004

OTHER PUBLICATIONS

Extended European Search Report for Application No. EP20175437.1, dated Oct. 19, 2020, 7 pages.
(Continued)

*Primary Examiner* — Otis L Thompson, Jr.
(74) *Attorney, Agent, or Firm* — Harrity & Harrity, LLP

(57) ABSTRACT

A first network device may communicate, in association with a tunnel establishment network protocol, with a second network device to cause a network tunnel between the first network device and the second network device to be established. The first network device may determine, based on communicating with the second network device to cause the network tunnel to be established, that the network tunnel is to support network micro-tunnel functionality within the network tunnel. The first network device may communicate, based on determining that the network tunnel is to support network micro-tunnel functionality, with the second network device to identify a traffic class, of one or more traffic classes, to which network micro-tunnel functionality within the network tunnel is to be applied. The first network device may cause a network micro-tunnel to be established within the network tunnel for traffic associated with the traffic class.

20 Claims, 15 Drawing Sheets

500

510 Communicate, by a first network device and in association with a tunnel establishment network protocol, with a second network device to cause a network tunnel between the first network device and the second network device to be established 520 Determine, by the first network device and based on communicating with the second network device to cause the network tunnel to be established, that the network tunnel is to support network micro-tunnel functionality between the first network device and the second network device within the network tunnel 530 Communicate, by the first network device and based on determining that the network tunnel is to support network micro-tunnel functionality within the network tunnel, with the second network device to identify a traffic class, of one or more traffic classes, to which network micro-tunnel functionality within the network tunnel is to be applied 540 Cause a network micro-tunnel to be established within the network tunnel for traffic associated with the traffic class

(51) Int. Cl.
*H04L 47/2483* (2022.01)
*H04L 9/40* (2022.01)
*H04L 69/22* (2022.01)

(52) U.S. Cl.
CPC ........ *H04L 63/0428* (2013.01); *H04L 63/164* (2013.01); *H04L 69/22* (2013.01); *H04L 2212/00* (2013.01)

(56) References Cited

U.S. PATENT DOCUMENTS

2004/0085951 A1* 5/2004 Rezaiifar ................ H04W 8/04 370/352
2008/0025312 A1 1/2008 Kuppuswamy et al.
2008/0305772 A1 12/2008 Balasubramanian et al.
2009/0016282 A1 1/2009 Gasparroni et al.
2011/0078783 A1 3/2011 Duan et al.
2012/0054852 A1* 3/2012 Gibbs .................. H04W 12/03 370/252
2013/0010686 A1* 1/2013 Shatzkamer .......... H04W 40/00 370/328
2013/0263249 A1* 10/2013 Song ..................... H04L 63/164 726/14
2016/0057116 A1 2/2016 Charan et al.
2016/0337398 A1 11/2016 Lou et al.
2017/0105142 A1 4/2017 Hecht et al.
2018/0060745 A1 3/2018 Christodorescu et al.
2019/0075099 A1* 3/2019 Brouchier ............. H04L 9/3263
2020/0213152 A1* 7/2020 Choquette ............. H04L 63/029
2020/0302050 A1 9/2020 Jain et al.
2021/0136041 A1 5/2021 Foxhoven et al.
2021/0306178 A1 9/2021 Paruchuri et al.

OTHER PUBLICATIONS

Juniper Networks, Inc., "IPsec VPN User Guide for Security Devices", Dec. 26, 2019, pp. 1-1753.

* cited by examiner

ESTABLISHING A NETWORK MICRO-TUNNEL WITHIN A NETWORK TUNNEL

RELATED APPLICATION

This application is a continuation of U.S. patent application Ser. No. 16/829,700, filed Mar. 25, 2020 (now U.S. Pat. No. 11,323,290), which is incorporated herein by reference in its entirety.

BACKGROUND

Internet Protocol Security (IPsec) is a protocol suite for secure Internet Protocol (IP) communications that works by authenticating and encrypting each IP packet of a communication session. IPsec includes protocols for establishing mutual authentication between agents at the beginning of the session and negotiation of cryptographic keys to be used during the session. IPsec can be used in protecting data flows between a pair of hosts (host-to-host), between a pair of security gateways (network-to-network), or between a security gateway and a host (network-to-host). IPsec may establish IPsec Security Associations (SAs) between agents that describe how the agents will use security services to communicate securely, such as by utilizing a network tunnel.

A network tunnel is a mechanism for secure transmission of private information through a public network such that that network devices of the public network are unaware of the private information. A tunneling protocol is a communications protocol that enables creation of a network tunnel. The tunneling protocol enables private information to be sent across a public network through a process called encapsulation.

SUMMARY

According to some implementations, a method may include communicating, by a first network device and in association with a tunnel establishment network protocol, with a second network device to cause a network tunnel between the first network device and the second network device to be established; determining, by the first network device and based on communicating with the second network device to cause the network tunnel to be established, that the network tunnel is to support network micro-tunnel functionality between the first network device and the second network device within the network tunnel; communicating, by the first network device and based on determining that the network tunnel is to support network micro-tunnel functionality within the network tunnel, with the second network device to identify a traffic class, of one or more traffic classes, to which network micro-tunnel functionality within the network tunnel is to be applied; and causing, by the first network device, a network micro-tunnel to be established within the network tunnel for traffic associated with the traffic class.

According to some implementations, a network device may include one or more memories and one or more processors. The one or more processors may: communicate with an additional network device to cause an Internet Protocol Security protocol security association (SA) between the network device and the additional network device to be established; determine, based on communicating with the additional network device to cause the SA to be established, that the SA is to support micro-SA functionality between the network device and the additional network device within the SA; communicate, based on determining that the SA is to support micro-SA functionality within the SA, with the additional network device to identify a traffic class, of one or more traffic classes, to which network micro-SA functionality within the SA is to be applied; and cause a micro-SA to be established within the SA for traffic associated with the traffic class.

According to some implementations, a non-transitory computer-readable medium may store one or more instructions. The one or more instructions, when executed by one or more processors of a network device, may cause the one or more processors to: communicate with an additional network device to cause an Internet Protocol Security protocol security association (SA) between the network device and the additional network device to be established; determine, based on communicating with the additional network device to cause the SA to be established, that the SA is to support micro-SA functionality between the network device and the additional network device within the SA; identify, after determining that the SA is to support micro-SA functionality between the network device and the additional network device within the SA, one or more packets associated with a traffic class, of one or more traffic classes, wherein the one or more packets were transmitted between the network device and the additional network device via the SA and were rejected because of an anti-replay policy associated with the SA; and cause a micro-SA to be established within the SA for additional traffic associated with the traffic class.

DETAILED DESCRIPTION

Figure 1A:
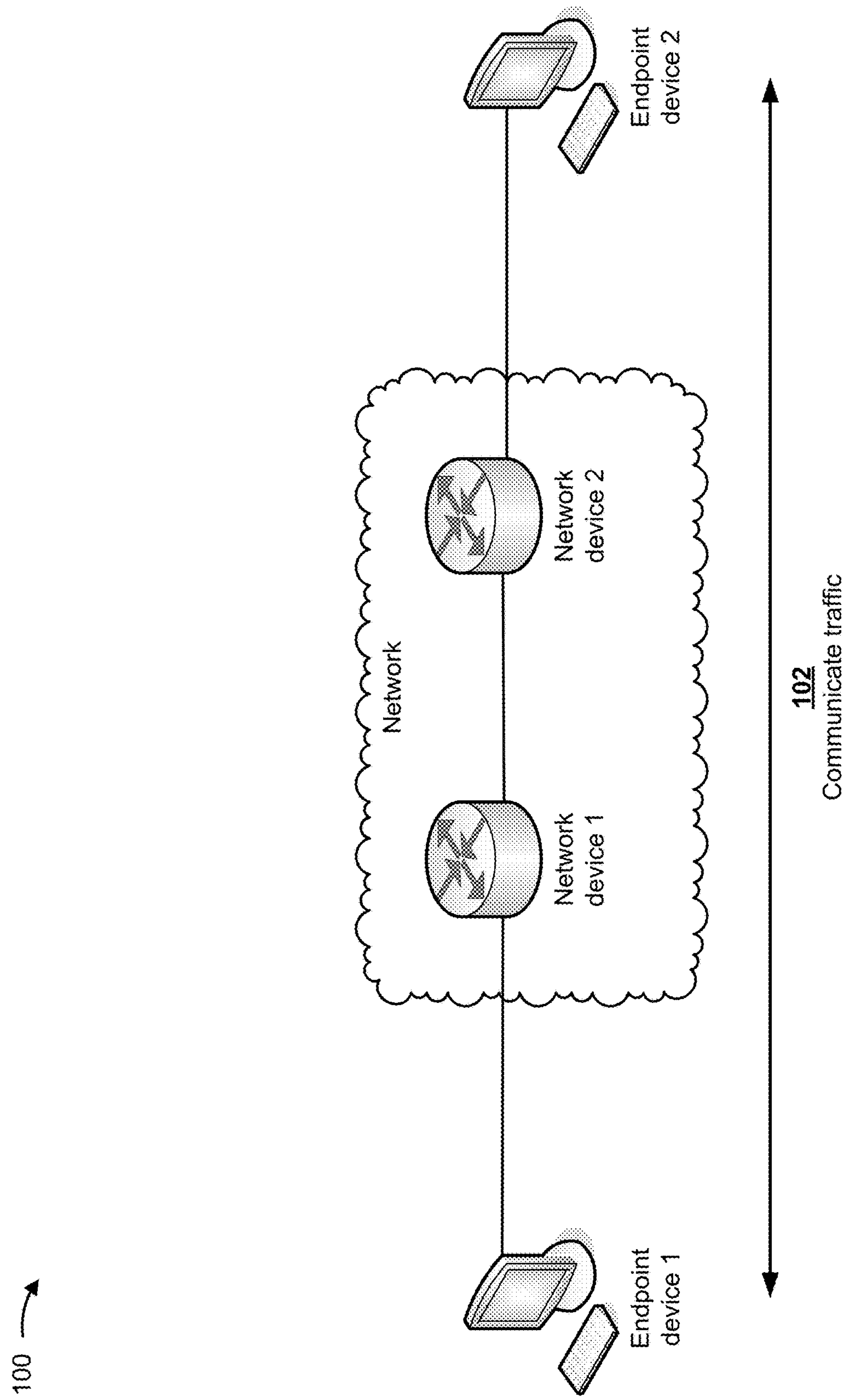
FIGS. 1A-1I are diagrams of one or more example implementations described herein.

The following detailed description of example implementations refers to the accompanying drawings. The same reference numbers in different drawings may identify the same or similar elements.

In some instances, network devices may communicate different types of network traffic via a network tunnel, such as a tunnel that uses Internet Protocol Security (IPsec) Security Association (SA). The network devices may track network traffic entering the network tunnel using sequence identifiers. The network devices may utilize an anti-replay protocol associated with the network tunnel, such that a receiving network device (e.g., a network device that receives network traffic) may identify a range (e.g., a window) of sequence identifiers that are acceptable (e.g., if the receiving network device receives network traffic associated with a sequence identifier that is outside of the acceptable range of sequence identifiers, the receiving network device will reject the network traffic). As additional network traffic is communicated between the network devices, the network devices may increment the sequence identifiers associated with the additional network traffic. Similarly, as additional network traffic is communicated between the network devices, the network devices may adjust (e.g., slide) the acceptable range of sequence identifiers (e.g., such that as additional sequence identifiers are generated, the acceptable range may be adjusted so that older sequence identifiers are not acceptable) associated with the network tunnel.

In some instances, the network devices may prioritize one type of network traffic (e.g., higher priority network traffic) over another type of network traffic (e.g., lower priority network traffic) when communicating the different types of network traffic over a network tunnel. As such, the network devices may delay the communication of lower priority network traffic in favor of communicating higher priority network traffic. However, delaying the communication of the lower priority network traffic may cause the receiving network device to reject the delayed lower priority traffic because the sequence identifier associated with the lower priority network traffic is no longer within the acceptable range of sequence identifiers. This may waste computing resources (e.g., processing resources, memory resources, communication resources, and/or the like) and/or network resources associated with identifying the rejected network traffic, locating the rejected network traffic, causing the rejected network traffic to be re-communicated via the network tunnel, and/or the like.

According to some implementations described herein, a network device may establish a network micro-tunnel within a network tunnel for communicating network traffic. In some implementations, the network device may communicate with an additional network device to cause a network tunnel to be established between the network device and the additional network device, such as a network tunnel that uses an IPsec SA. The network device may determine, based on communicating with the additional network device, that the network tunnel may support network micro-tunnel functionality within the network tunnel. The network device may communicate with the additional network device to identify a traffic class, of one or more traffic classes, to which the network micro-tunnel functionality within the network tunnel is to be applied. The network device may cause a network micro-tunnel to be established within the network tunnel for network traffic associated with the traffic class, such that all network traffic associated with the traffic class is communicated via the network micro-tunnel.

The network micro-tunnel (e.g., a network micro-tunnel that uses a micro-SA) may use the same encryption policy as the network tunnel, but may maintain a separate counter (e.g., for determining the acceptable range of sequence identifiers) for sequence identifiers associated with the particular traffic class. Accordingly, lower priority network traffic associated with the particular traffic class is accepted or rejected by a receiving network device based on an acceptable range of sequence identifiers associated with the particular traffic class, rather than all types of network traffic. As such, if communication of the lower priority traffic associated with a particular traffic class is delayed by the network devices, the receiving network device may not reject the lower priority traffic based on the lower priority traffic being associated with an older sequence identifier as the acceptable range of sequence identifiers is associated with the particular traffic class of the lower priority traffic, rather than all network traffic. In this way, the network device may conserve computing resources (e.g., processing resources, memory resources, communication resources, and/or the like) and/or network resources that would have otherwise been used identifying rejected network traffic, locating the rejected network traffic, causing the rejected network traffic to be re-communicated via the network tunnel, and/or the like.

FIGS. 1A-1I are diagrams of one or more example implementations 100 described herein. As shown in FIG. 1A, the example implementation(s) 100 may include one or more endpoint devices (e.g., endpoint device 1 and/or endpoint device 2) that communicate network traffic over a network. The network may include one or more network devices (e.g., network device 1 and network device 2 are shown for simplicity) that manage communication (or a flow) of network traffic to a network, from a network, and/or within a network. In some implementations, network device 1 and network device 2 are edge devices that establish a network tunnel through the network. In some implementations, network device 1 may be capable of performing one or more (or all) of the functions described herein with respect to network device 2, and vice versa.

As shown in FIG. 1A, and by reference number 102, endpoint device 1 and endpoint device 2 may communicate network traffic over the network. For example, network device 1 may receive network traffic from endpoint device 1 that is destined for endpoint device 2, via the network. Network device 1 may cause the network traffic to be transmitted to network device 2. Network device 2 may cause the network traffic to be transmitted to endpoint device 2. Network device 1 and/or network device 2 may determine the destination of the network traffic by analyzing the network traffic (e.g., analyzing a header of the network traffic, and/or the like).

Figure 1B:
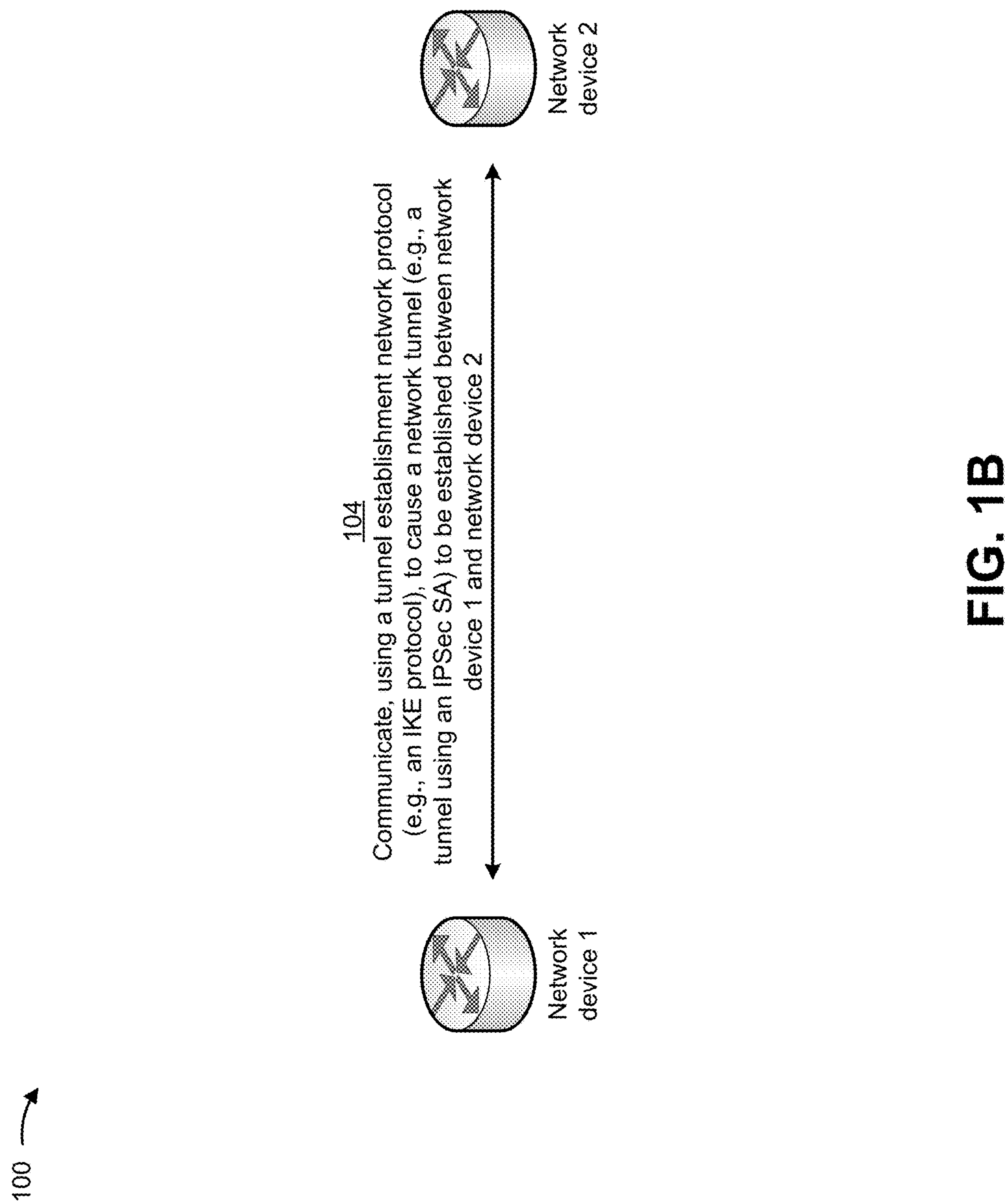

As shown in FIG. 1B, and by reference number 104, network device 1 may communicate with network device 2, using a tunnel establishment network protocol (e.g., an internet key exchange (IKE) protocol), to cause a network tunnel for communicating network traffic to be established between network device 1 and network device 2. The network tunnel may be a network tunnel using Internet Protocol Security (IPsec) Security Association (SA). The IKE protocol may be used to establish an encrypted communication session between network device 1 and network device 2. The IKE protocol may include two phases. In a first phase (Phase 1), network device 1 and network device 2 may negotiate an SA (e.g., associated with an IKE tunnel) for the encrypted communication session. The SA negotiated from Phase 1 enables network device 1 and/or network device 2 to communicate securely in a second phase (Phase 2). During Phase 2 of the IKE protocol, network device 1 and network device 2 may establish SAs for other applications, such as IPsec.

The IKE protocol may establish an IPsec SA by establishing a shared state between network device 1 and network device 2. The shared state defines specific services provided to network traffic, which cryptographic models will be utilized to provide the specific services, keys utilized as input to the cryptographic models, parameters for communication of the network traffic, and/or the like. The IKE protocol may perform a mutual authentication between network device 1 and network device 2, and may establish an IPsec SA that includes shared secret information that can be used to efficiently establish SAs for an encapsulating security payload (ESP) or an authentication header (AH) and a set of cryptographic models to be used by the SAs to protect network traffic carried by the IPsec SA.

The network tunnel (e.g., the network tunnel that uses the IPsec SA) may be associated with a counter. The counter may be used to determine acceptable network traffic received by a network device based on comparing a sequence identifier associated with the network traffic to a counter identifier. A counter may be stored by network device 1 and/or network device 2. The counter may generate counter identifiers in a sequential order in response to a network device receiving network traffic (e.g., the network device may increment the counter identifier each time a packet is received by the network device). The counter may be used to generate sequence identifiers associated with network traffic transmitted by the network devices. Each packet associated with network traffic transmitted by a network device may be associated with a sequence identifier. The counter identifiers may correspond to the sequence identifiers (e.g., the sequence identifier may be the same or related to the current counter identifier).

For example, the counter identifiers may be numbers, starting at 0, and may be generated sequentially (e.g., from 0 to 1 to 2 to 3, etc.). For example, a counter may be initialized by setting the counter identifier to 0. Network device 1 may receive a first packet. Network device 1 may increment the counter identifier based on receiving the first packet (e.g., causing the counter identifier to be changed to 1). Network device 1 may generate a sequence identifier based on the counter identifier (e.g., generate a sequence identifier of 1). Network device 1 may associate with first packet with the generated sequence identifier and transmit the first packet to the destination location, such as network device 2. Network device 1 may receive a second packet. Network device 1 may cause the counter identifier to correspond with the new sequence identifier, such as by incrementing the counter identifier, such that the counter identifier is changed to 2. Network device 1 may generate a sequence identifier based on the new counter identifier (e.g., generate a sequence identifier of 2). Network device 1 may associate with second packet with the generated sequence identifier (e.g., 2) and transmit the second packet to the destination location, such as network device 2.

Similarly, when network device 2 receives a packet, network device 2 may increment the counter identifier (e.g., if this is the first packet received by network device 2 after establishing the network tunnel, network device 2 may cause the counter identifier to be 1 when receiving the first packet). For example, network device 2 may receive the first packet and cause the counter identifier to be 1. Network device 2 may receive the second packet and cause the counter identifier to be 2. Network device 2 may increment the counter identifier each time a packet is received by network device 2. Although the counter identifier and sequence identifier have been described above as numbers, the counter identifier and sequence identifier may be bits, numbers, and/or the like.

The network devices may use the counter identifier to determine whether to accept or reject a packet received from another network device. The network devices may accept a packet if the counter identifier corresponds to the sequence identifier associated with the packet. The counter identifier may correspond to the sequence identifier if the counter identifier and the sequence identifier match, if the sequence identifier falls within a range of counter identifiers (e.g., if the counter identifier is 15, the network device may determine the range of acceptable sequence identifiers is between 10 and 15), and/or the like.

Figure 1C:
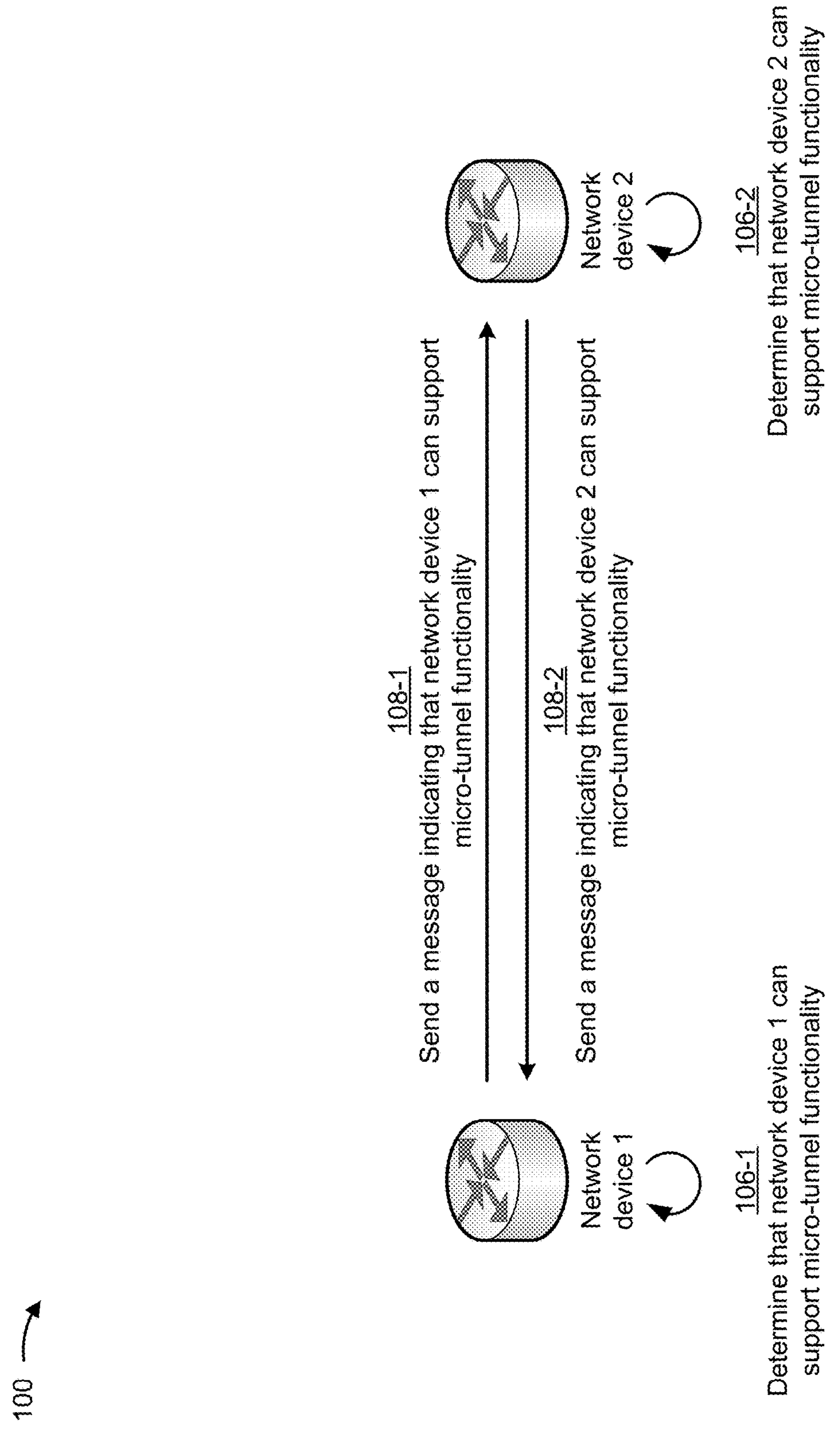

As shown in FIG. 1C, and by reference number 106, the network devices may determine that the network devices can support micro-tunnel functionality (e.g., micro-SA functionality). Micro-tunnel functionality refers to a network device's ability to establish a network micro-tunnel (e.g., using an IPsec micro-SA) within a network tunnel (e.g., using an IPsec SA), as described herein. For example, as shown by reference number 106-1, network device 1 may determine that network device 1 can support micro-tunnel functionality. Similarly, as shown by reference number 106-2, network device 2 may determine that network device 2 can support micro-tunnel functionality. Network device 1 may determine that network device 1 can support micro-tunnel functionality based on a configuration setting associated with network device 1. Network device 2 may determine that network device 2 can support micro-tunnel functionality based on a configuration setting associated with network device 2.

As shown in FIG. 1C, and by reference number 108, the network devices may exchange messages indicating whether the network devices can support micro-tunnel functionality. For example, as shown by reference number 108-1, network device 1 may send a message to network device 2 indicating that network device 1 can support micro-tunnel functionality. Similarly, as shown by reference number 108-2, network device 2 may send a message to network device 1 indicating that network device 2 can support micro-tunnel functionality. The network devices may exchange the messages when the network tunnel is established (e.g., as part of the IKE protocol). Alternatively, the network devices may exchange the messages after the network tunnel has been established.

Figure 1D:
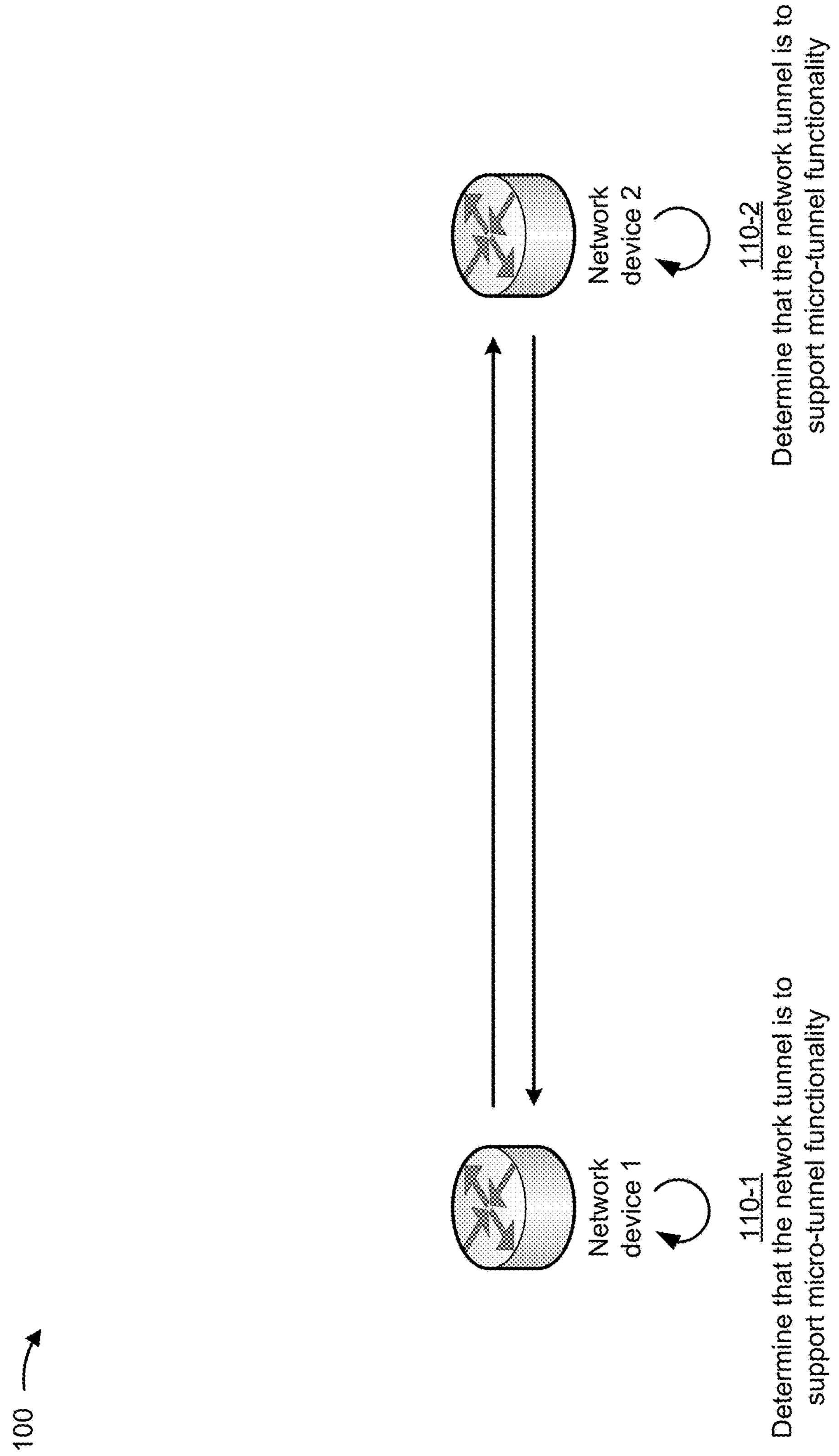

As shown in FIG. 1D, and by reference number 110, the network devices may determine that the network tunnel is to support micro-tunnel functionality. For example, as shown by reference number 110-1, network device 1 may determine, based on network device 1 determining that network device 1 can support micro-tunnel functionality and based on receiving the message that network device 2 can support micro-tunnel functionality, that the network tunnel is to support micro-tunnel functionality. As shown by reference number 110-2, network device 2 may determine that the network tunnel is to support micro-tunnel functionality in a similar manner as described with respect to network device 1 and reference number 110-1.

If network device 1 and/or network device 2 determine that the network tunnel is not to support micro-tunnel functionality, the network devices may not proceed with establishing one or more network micro-tunnels within the network tunnel. For example, if network device 1 determines that the network tunnel is not to support network tunnel functionality (e.g., by determining that network device 1 cannot support micro-tunnel functionality (e.g., based on a configuration setting associated with network device 1), based on receiving a message from network device 2 indicating that network device 2 cannot support micro-tunnel functionality, based on not receiving a message from network device 2 indicating that network device 2 can support micro-tunnel functionality, and/or the like), then network device 1 may proceed with communicating network traffic via the network tunnel (e.g., the network tunnel that uses IPsec SA) without using any network micro-tunnels.

Figure 1E:
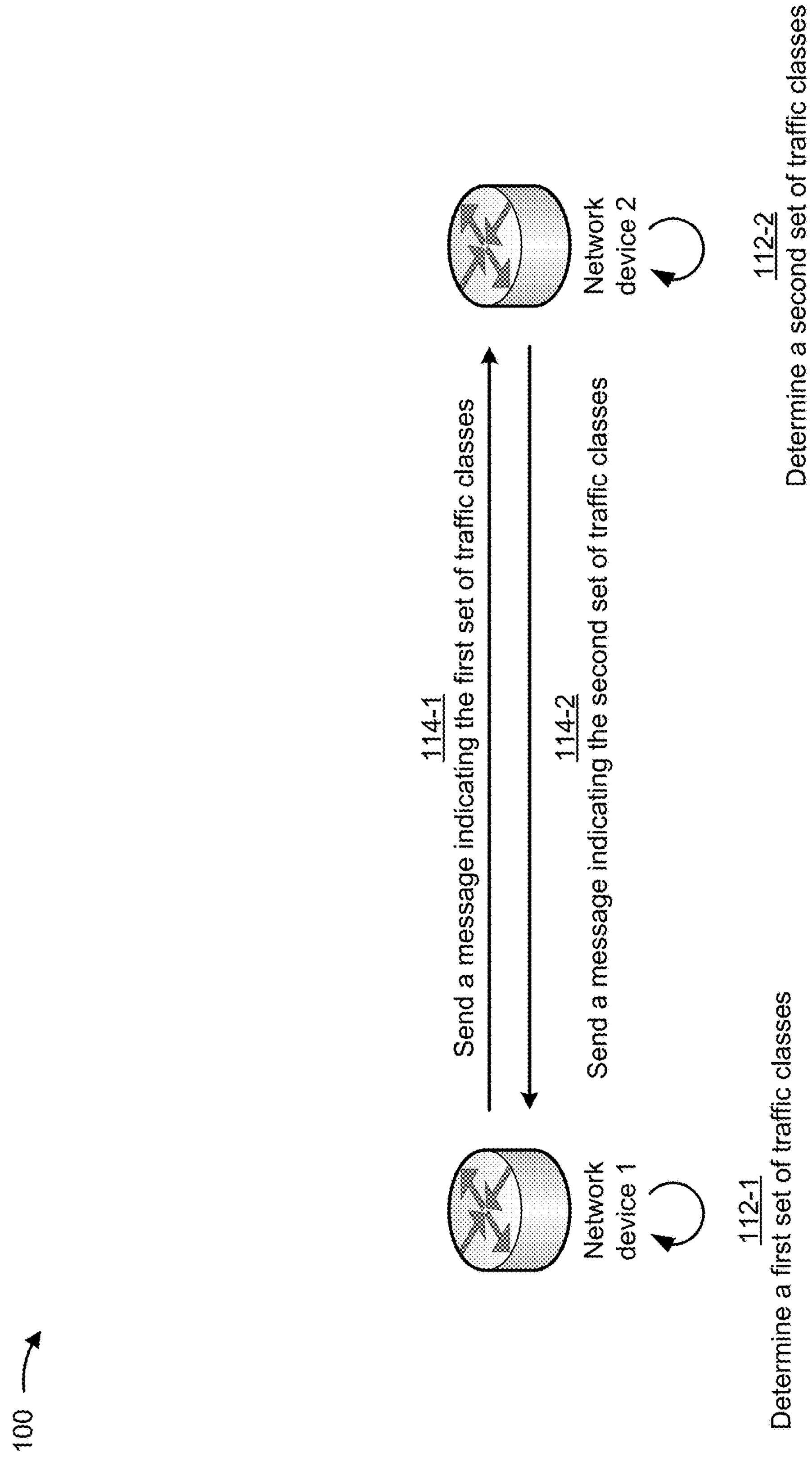

As shown in FIG. 1E, and by reference number 112, the network devices may determine one or more sets of traffic classes associated with micro-tunnel functionality. For example, as shown by reference number 112-1, network device 1 may determine a first set of traffic classes associated with micro-tunnel functionality. Network device 1 may determine the first set of traffic classes based on a configuration setting associated with network device 1. The first set of traffic classes may be traffic classes that network device 1 has been configured to communicate via a network micro-tunnel.

The first set of traffic classes may be identified and configured by a user associated with network device 1. Additionally, or alternatively, the first set of traffic classes may be determined by network device 1 based on analyzing previous sets of network traffic. For example, network device 1 may determine that one or more traffic classes are associated with rejection by a receiving network device (e.g., based on an anti-replay protocol, based on communication of the traffic class being delayed by network device 1, and/or the like), are associated with a delay in communication by network device 1, are associated with a lower priority, and/or the like. Network device 1 may add the one or more traffic classes to the first set of traffic classes.

As shown by reference number 112-2, network device 2 may determine a second set of traffic classes associated with micro-tunnel functionality. Network device 2 may determine the second set of traffic classes in a similar (or the same) manner as described above with respect to the first set of traffic classes.

A traffic class may be a type of traffic and/or a category of traffic associated with network traffic sent via the network tunnel. Traffic classes may include a web traffic class, a voice of Internet protocol (VoIP) traffic class, a control traffic (e.g., quality of service (QoS) traffic, network scheduling traffic, and/or the like) class, a streaming multimedia traffic (e.g., audio streaming traffic, video streaming traffic, and/or the like) class, a file transfer traffic class, a message traffic (e.g., email traffic, instant message traffic, and/or the like) class, an upload traffic class, a download traffic class, an application traffic class, and/or the like.

As shown in FIG. 1E, and by reference number 114, the network devices may exchange messages indicating the traffic classes associated with micro-tunnel functionality. For example, as shown by reference number 114-1, network device 1 may send a message to network device 2 indicating the first set of traffic classes. As shown by reference number 114-2, network device 2 may send a message to network device 1 indicating the second set of traffic classes.

Network device 1 may receive the message from network device 2 indicating the second set of traffic classes. Network device 1 may identify the second set of traffic classes. In some implementations, the second set of traffic classes may be stored by network device 1. Similarly, network device 2 may receive the message from network device 1 indicating the first set of traffic classes. Network device 2 may identify the first set of traffic classes and the first set of traffic classes may be stored by network device 2.

Figure 1F:
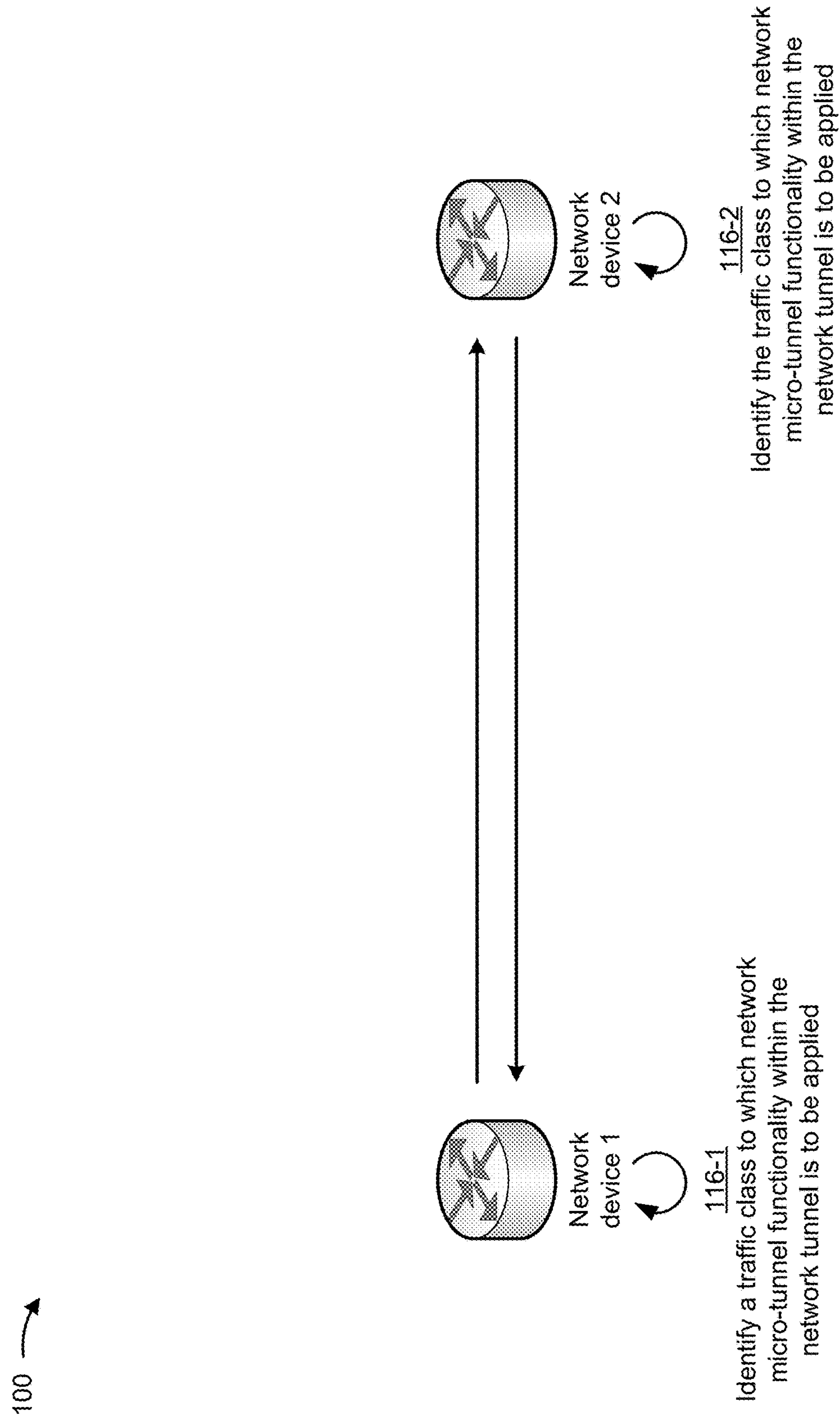

As shown in FIG. 1F, and by reference number 116, the network devices may identify one or more traffic classes to which micro-tunnel functionality is to be applied (e.g., the network devices may identify the one or more traffic classes that are to be communicated via a network micro-tunnel within the network tunnel). The network devices may identify the one or more traffic classes to which micro-tunnel functionality is to be applied based on analyzing the first set of traffic classes and the second set of traffic classes.

For example, as shown by reference number 116-1, network device 1 may identify a traffic class to which network micro-tunnel functionality within the network tunnel is to be applied by processing the first set of traffic classes and the second set of traffic classes. Network device 1 may compare the first set of traffic classes and the second set of traffic classes to identify one or more matching traffic classes between the first set of traffic classes and the second set of traffic classes. For example, if the first set of traffic classes identifies a web traffic class, a VoIP traffic class, and a control traffic class and the second set of traffic classes identifies a web traffic class and a VoIP traffic class, network device 1 may identify that the traffic classes to which network micro-tunnel functionality is to be applied are the web traffic class and the VoIP traffic class.

As shown by reference number 116-2, network device 2 may identify the one or more traffic class to which network micro-tunnel functionality within the network tunnel is to be applied by processing the first set of traffic classes and the second set of traffic classes in a similar (or the same) manner as described above with respect to network device 1.

In some implementations, only one network device may identify the one or more traffic class to which network micro-tunnel functionality within the network tunnel is to be applied by processing the first set of traffic classes and the second set of traffic classes. For example, network device 1 may identify the one or more traffic class to which network micro-tunnel functionality within the network tunnel is to be applied, as described above. Network device 1 may send a message to network device 2 indicating the one or more traffic class to which network micro-tunnel functionality within the network tunnel is to be applied. In this example, network device 1 may not send the message to network device 2 indicating the first set of traffic classes (as described above with respect to reference number 114-1). This may conserve computing resources and/or network resources that would have otherwise been used by network device 2 to receive the message indicating the first set of traffic classes, to store the first set of traffic classes, to process the first set of traffic classes and the second set of traffic classes to identify the one or more traffic class to which network micro-tunnel functionality within the network tunnel is to be applied, and/or the like.

In some implementations, network device 1 may identify the one or more traffic class to which network micro-tunnel functionality within the network tunnel is to be applied based on the first set of traffic classes (e.g., without receiving the second set of traffic classes from network device 2). In this example, network device 2 may be configured to receive and transmit the same traffic classes as network device 1. Network device 1 may send a message to network device 2 indicating the one or more traffic class (e.g., determined based on the first set of traffic classes only) to which network micro-tunnel functionality within the network tunnel is to be applied. This may conserve computing resources and/or network resources that would have otherwise been used by network device 2 to send the message indicating the second set of traffic classes, to receive the message indicating the first set of traffic classes, to store the first set of traffic classes, to process the first set of traffic classes and the second set of traffic classes to identify the one or more traffic class to which network micro-tunnel functionality within the network tunnel is to be applied, and/or the like.

Figure 1G:
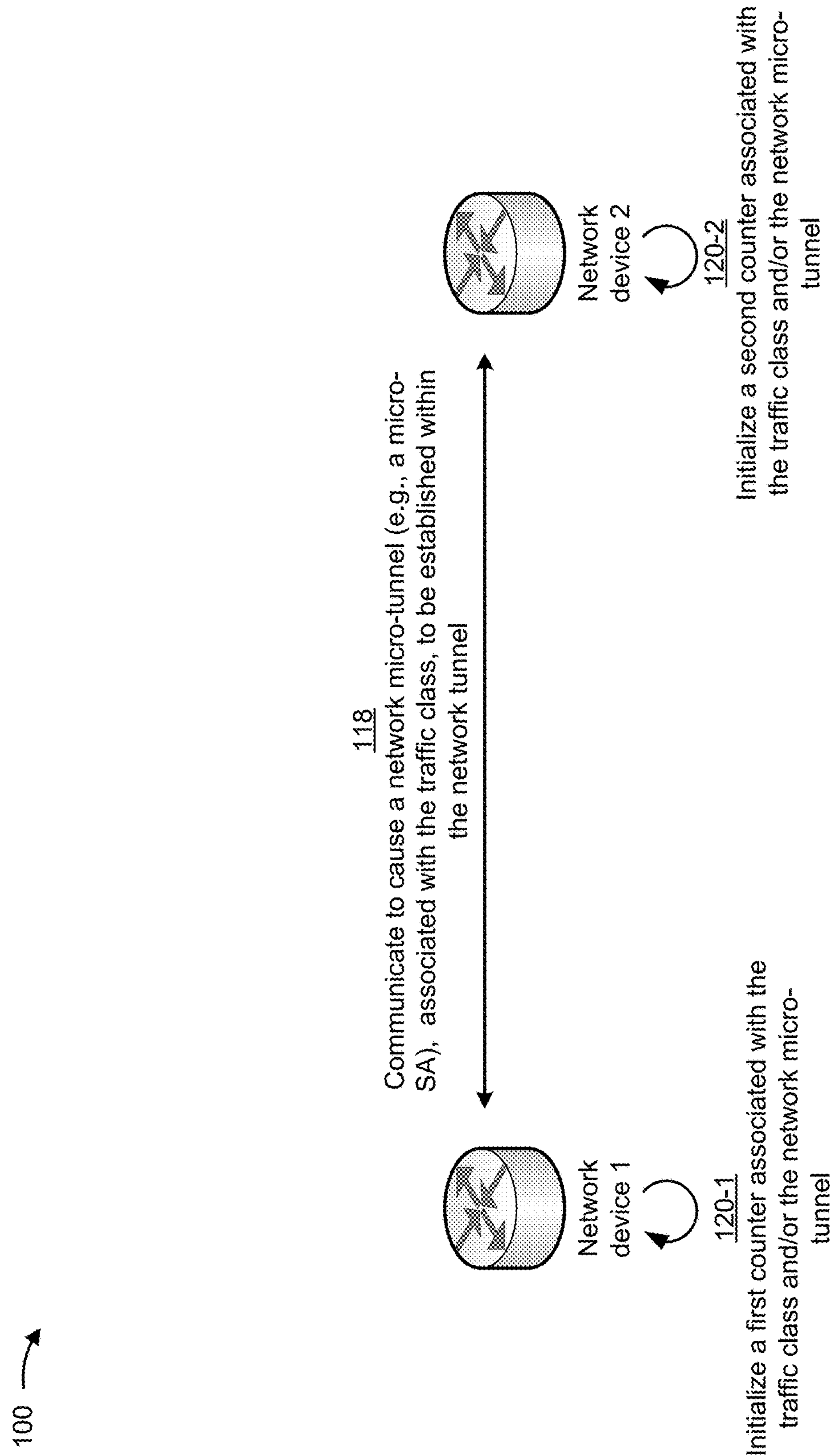

As shown in FIG. 1G, and by reference number 118, network device 1 and network device 2 may communicate to cause a network micro-tunnel (e.g., a micro-SA tunnel), associated with a traffic class that was identified as a traffic class to which network micro-tunnel functionality within the network tunnel is to be applied, to be established within the network tunnel. Network device 1 and network device 2 may cause the network micro-tunnel to be established in a similar manner to establishing the network tunnel (e.g., using an IKE protocol), as described above. The network micro-tunnel may be associated with the same security protocols as the network tunnel (e.g., encryption protocols, security characteristics (e.g., keys, security identifiers, and/or the like), and/or the like). However, the network micro-tunnel may not be associated with the same counter as the network tunnel. The network micro-tunnel may establish a counter associated with the network micro-tunnel that is separate from the counter associated with the network tunnel.

As shown in FIG. 1G, and by reference number 120, the network devices may initialize a counter associated with the traffic class and/or the network micro-tunnel. For example, as shown by reference number 120-1, network device 1 may initialize a first counter associated with the traffic class and/or the network micro-tunnel. The first counter may be initialized by generating an initial counter identifier. For example, the initial counter identifier may be 0. When network device 1 receives or transmits a packet of network traffic associated with the traffic class, network device 1 may increment the counter identifier in a sequential manner (e.g., cause the counter identifier to be changed to 1). As described above, the counter identifier associated with the first counter may be bits, numbers, and/or the like.

Network device 1 may store the counter in a data structure associated with network device 1. The data structure may identify the first counter, a counter identifier associated with the first counter, an identifier associated with the traffic class, an identifier associated with the network micro-tunnel, an identifier associated with network device 2 associated with the network micro-tunnel, and/or the like. The data structure may identify one or more network micro-tunnels established by network device 1 and information associated with each network micro-tunnel. The data structure may be a list, a tree, a graph, a mapping, a hash, a linked list, and/or the like. The data structure may be stored by network device 1 within a memory of network device 1, within a memory external to network device 1, within a cloud computing platform, within a server device, and/or the like.

As shown by reference number 120-2, network device 2 may initialize a second counter associated with the traffic class and/or the network micro-tunnel. Network device 2 may initialize the second counter in a similar (or the same) manner as described above with respect to network device 1. Network device 2 may store the second counter in a data structure. The data structure may be configured and stored in a similar (or the same) manner as described above with respect to network device 1.

Figure 1H:
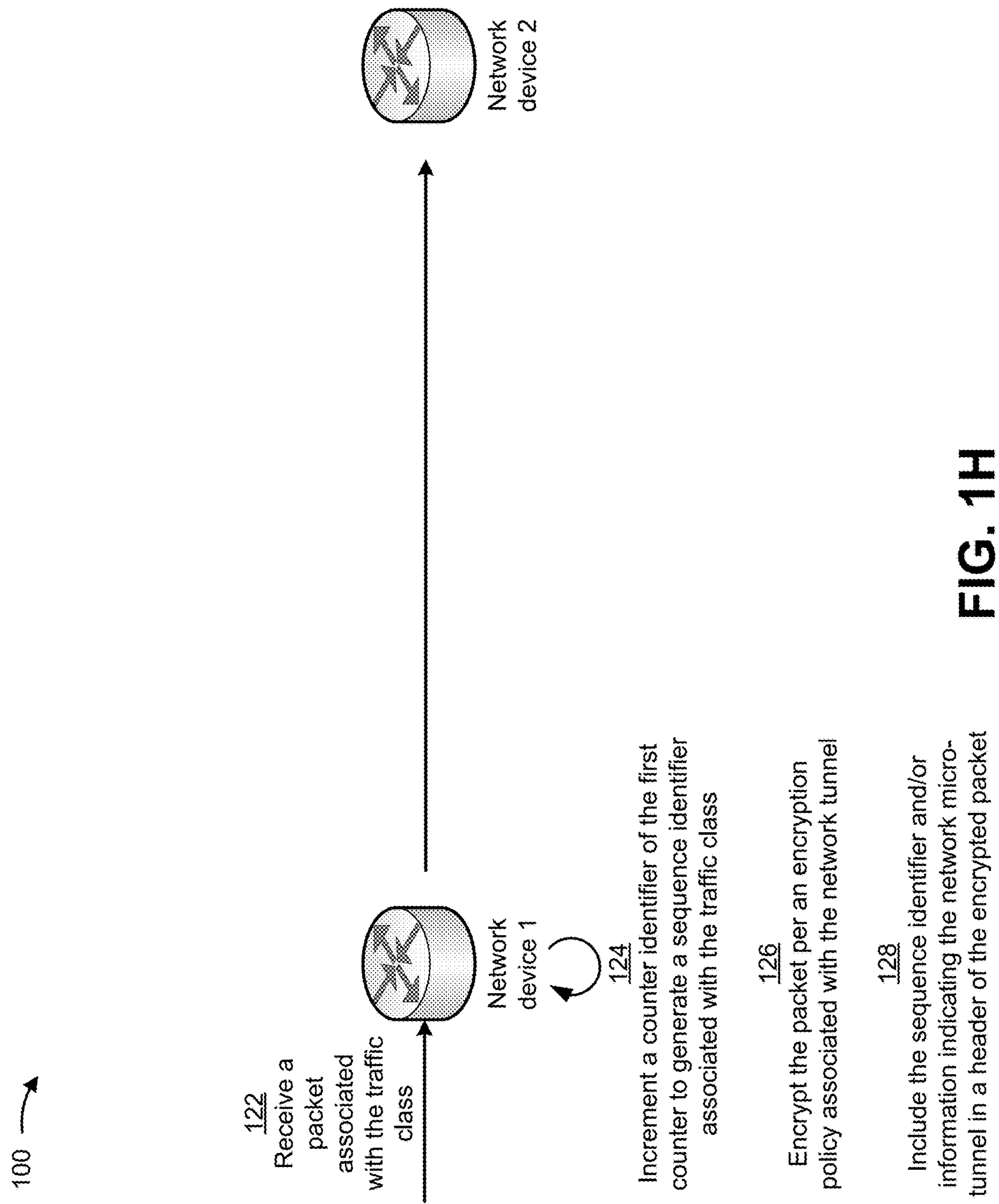

As shown in FIG. 1H, and by reference number 122, network device 1 may receive a packet associated with the traffic class that has been identified as a traffic class to which network micro-tunnel functionality is to be applied. Network device 1 may receive the packet from an endpoint device, another network device, and/or the like. Network device 1 may determine the traffic class associated with the packet by analyzing the packet (e.g., by analyzing a header associated with the packet, by performing deep packet inspection (DPI), and/or the like) to identify the traffic class associated with the packet. Network device 1 may search the data structure stored by network device 1 to determine if the identified traffic class is associated with a network micro-tunnel (e.g., by searching the data structure for an identifier associated with the identified traffic class). Alternatively, network device 1 may determine that the identified traffic class is associated with a network micro-tunnel based on the identified traffic classes to which network micro-tunnel functionality within the network tunnel is to be applied (discussed above with respect to reference number 116). If network device 1 determines that the packet is associated with a traffic class that is not associated with a network micro-tunnel, network device 1 may transmit the packet via the network tunnel.

In some implementations, network device 1 may determine that the packet is associated with a traffic class that is associated with a network micro-tunnel based on at least one field of a header of the packet. The field of the header of the packet may be associated with one or more micro-selectors. The one or more micro-selectors may include a layer switching information (e.g., layer 2 switching information, layer 3 switching information, layer 4 switching information, and/or the like) field, a differentiated services code point (DSCP) field, a traffic application identifier field, a traffic origination address field, a traffic destination address field, a domain name system (DNS) field, a server name indication field, a port identifier field, a protocol identifier field, and/or the like.

As shown in FIG. 1H, and by reference number 124, network device 1 may increment the counter identifier of the first counter to generate a sequence identifier associated with the traffic class. Network device 1 may update the data structure that identifies the first counter with the incremented counter identifier. Network device 1 may increment the counter identifier of the first counter in response to receiving the packet and in response to determining that the packet is associated with the traffic class to which network micro-tunnel functionality within the network tunnel is to be applied. Network device 1 may use the incremented counter identifier to generate a sequence identifier associated with the packet. The generated sequence identifier may correspond to the incremented counter identifier (e.g., the sequence identifier may be the same as the incremented counter identifier, the sequence identifier may be related to the incremented counter identifier, and/or the like).

For example, network device 1 and network device 2 may have established a micro-tunnel within the network tunnel associated with the traffic class of web traffic. Network device 1 may receive a packet associated with web traffic. Network device 1 may determine, based on analyzing the packet, that the packet is associated with web traffic. Network device 1 may determine that, based on searching the data structure stored by network device 1 and/or based on the traffic classes determined to be associated with micro-tunnel functionality, web traffic is associated with a network micro-tunnel within the network tunnel. Network device 1 may access the first counter (that is associated with the network micro-tunnel for web traffic) and increment the counter identifier associated with the first counter. Network device 1 may generate the sequence identifier associated with the packet associated with web traffic based on the incremented counter identifier of the first counter (e.g., the sequence identifier may be related to the counter identifier).

As shown in FIG. 1H, and by reference number 126, network device 1 may encrypt the packet per an encryption policy associated with the network tunnel. Network device 1 may encrypt the packet in the same (or similar) manner as a packet that is being sent via the network tunnel (rather than the network micro-tunnel within the network tunnel). In this way, network traffic transmitted via a network micro-tunnel within the network tunnel have the same security protections as network traffic transmitted via the network tunnel. This adds additional security associated with the network tunnel to network traffic transmitted via a network micro-tunnel within the network tunnel while also conserving computing resources and/or network resources that would have otherwise been used applying additional or different security and/or encryption policies associated with the network micro-tunnel within the network tunnel.

As shown in FIG. 1H, and by reference number 128, network device 1 may include the sequence identifier (e.g., the sequence identifier generated based on the counter identifier, as discussed above with respect to reference number 124) and/or information indicating the network micro-tunnel in a header of the encrypted packet. Network device 1 may include the sequence identifier and/or information indicating the network micro-tunnel in an existing header of the encrypted packet. Alternatively, network device 1 may include the sequence identifier and/or information indicating the network micro-tunnel in a new or additional header of the encrypted packet. In some implementations, network device 1 may encapsulate the encrypted packet with an additional header that includes the sequence identifier associated with the packet. The additional header may be an authentication header, an encapsulating security payload header, and/or the like.

Figure 1I:
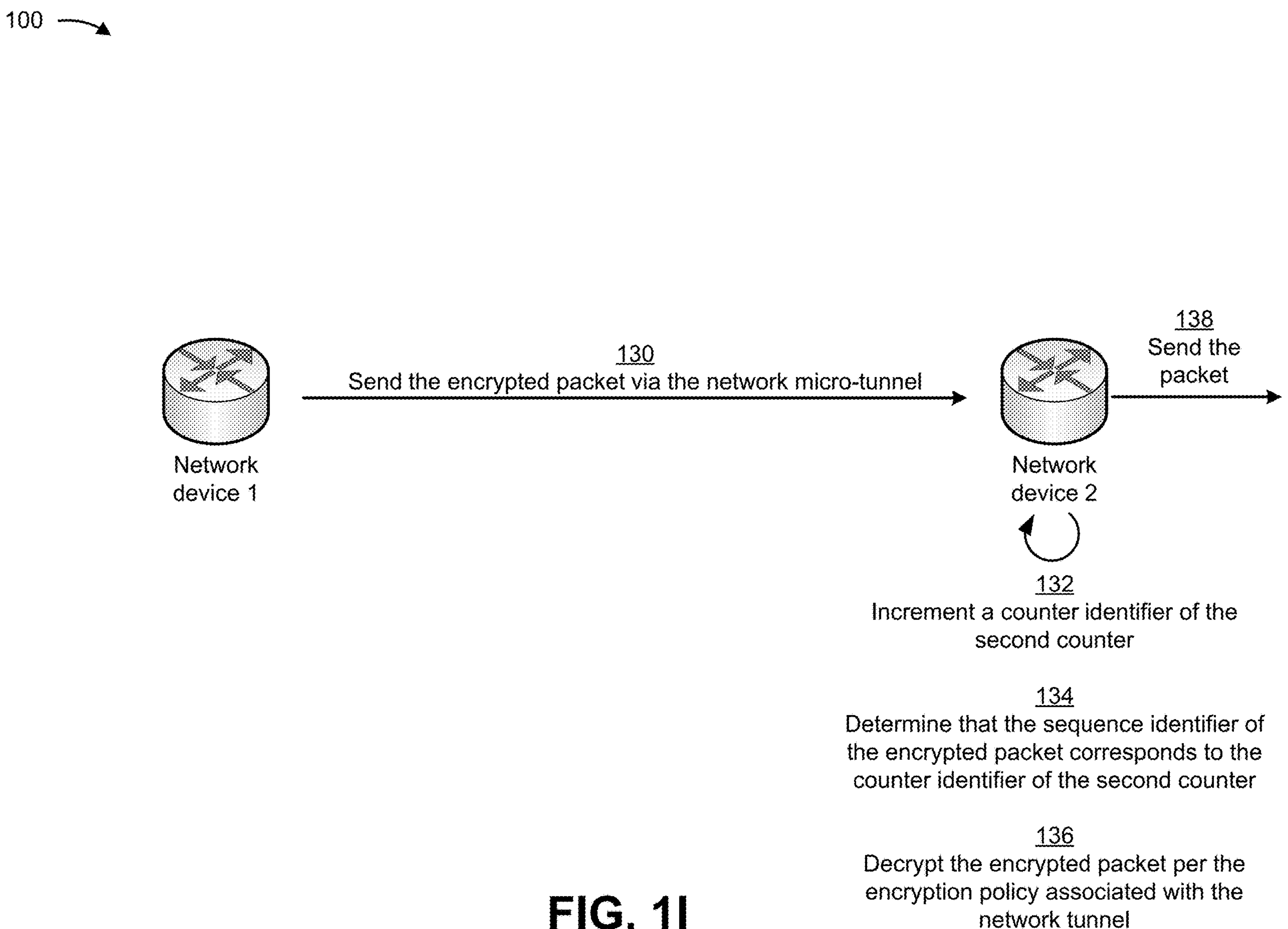

As shown in FIG. 1I, and by reference number 130, network device 1 may send the encrypted (and/or encapsulated) packet to network device 2 via the network micro-tunnel (e.g., the micro-SA tunnel) within the network tunnel (e.g., the IPsec SA tunnel). Network device 2 may receive the encrypted packet from network device 1. Network device 2 may identify the counter associated with the network micro-tunnel based on receiving the encrypted packet via the network micro-tunnel. Alternatively, network device 2 may analyze the encrypted packet to identify a sequence identifier associated with the encrypted packet and/or information associated with the network micro-tunnel (e.g., by analyzing the header of the encrypted packet). Network device 2 may identify the counter associated with the network micro-tunnel based on the identified information associated with the network micro-tunnel (e.g., by searching the data structured stored by network device 2, discussed above with respect to reference number 120-2). For example, network device 2 may determine that the counter, associated with the network micro-tunnel that the encrypted packet was received from, is the second counter.

As shown in FIG. 1I, and by reference number 132, network device 2 may increment a counter identifier of the second counter based on receiving the encrypted packet and identifying the second counter as being associated with the network micro-tunnel that the encrypted packet was received from. Network device 2 may update the data structure that identifies the second counter with the incremented counter identifier. For example, if the counter identifier of the second counter was 0 before the encrypted packet was received, network device 2 may increment the counter identifier of the second counter to 1, based on receiving the encrypted packet and identifying the second counter as being associated with the network micro-tunnel that the encrypted packet was received from. In some implementations, network device 2 may determine an acceptable range of sequence identifiers based on the incremented (or non-incremented) counter identifier. For example, network device 2 may determine that any sequence identifier that correspond to a range of previous counter identifiers is acceptable (e.g., if the incremented counter identifier is 15, network device 2 may determine that any sequence identifier that corresponds to counter identifiers 10 through 15 are acceptable). The acceptable range may vary based on user input, based on the traffic class associated with the network micro-tunnel, and/or the like.

As shown in FIG. 1I, and by reference number 134, network device 2 may determine that the identified sequence identifier of the encrypted packet corresponds to the incremented counter identifier of the second counter. Network device 2 identify the sequence identifier based on analyzing a header of the encrypted packet. Network device 2 may compare the identified sequence identifier and the incremented counter identifier of the second counter. Network device 2 may determine that the sequence identifier corresponds to the counter identifier if the sequence identifier and the counter identifier match, if sequence identifier corresponds to the acceptable range of counter identifiers, and/or the like. If network device 2 determines that the identified sequence identifier does not match the incremented counter identifier of the second counter and/or that the identified sequence identifier does not fall within the acceptable range of counter identifiers, network device 2 may reject the packet (e.g., drop the packet, not forward the packet to the destination associated with the packet, and/or the like).

As shown in FIG. 1I, and by reference number 136, if network device 2 determines that the identified sequence identifier matches the incremented counter identifier of the second counter and/or that the identified sequence identifier falls within the acceptable range of counter identifiers, network device 2 may decrypt the encrypted packet per the encryption policy associated with the network tunnel. Network device 2 may identify a destination address associated with the packet after decrypting the encrypted packet (e.g., by analyzing a header associated with the packet). In some implementations, the destination address may be identified prior to decrypting the encrypted packet (e.g., by analyzing a header associated with the packet).

As shown in FIG. 1I, and by reference number 138, network device 2 may send the packet toward the identified destination address associated with the packet. The destination address associated with the packet may be another network device, an endpoint device, a server device, and/or the like.

In this way, if communication of the packet was delayed by network device 1 (e.g., to communicate higher priority packets via the network tunnel or other network micro-tunnels within the network tunnel), then network device 2 will not reject the packet based on the delay (e.g., based on an anti-replay protocol) as the packet will be associated with a counter for the particular network micro-tunnel that the packet was sent on, rather than the counter for the entire network tunnel. As such, network device 1 and/or network device 2 may conserve computing resources and/or network resources that would have otherwise been used identifying rejected packets, locating the rejected packets, causing the rejected packets to be re-communicated via the network tunnel, and/or the like.

As indicated above, FIGS. 1A-1I are provided merely as one or more examples. Other examples may differ from what is described with regard to FIGS. 1A-1I. The number and arrangement of devices and/or networks shown in FIGS. 1A-1I are provided as one or more examples. In practice, there may be additional devices and/or networks, fewer devices and/or networks, different devices and/or networks, or differently arranged devices and/or networks than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) of FIGS. 1A-1I may perform one or more functions described as being performed by another set of devices of FIGS. 1A-1I.

Figure 2:
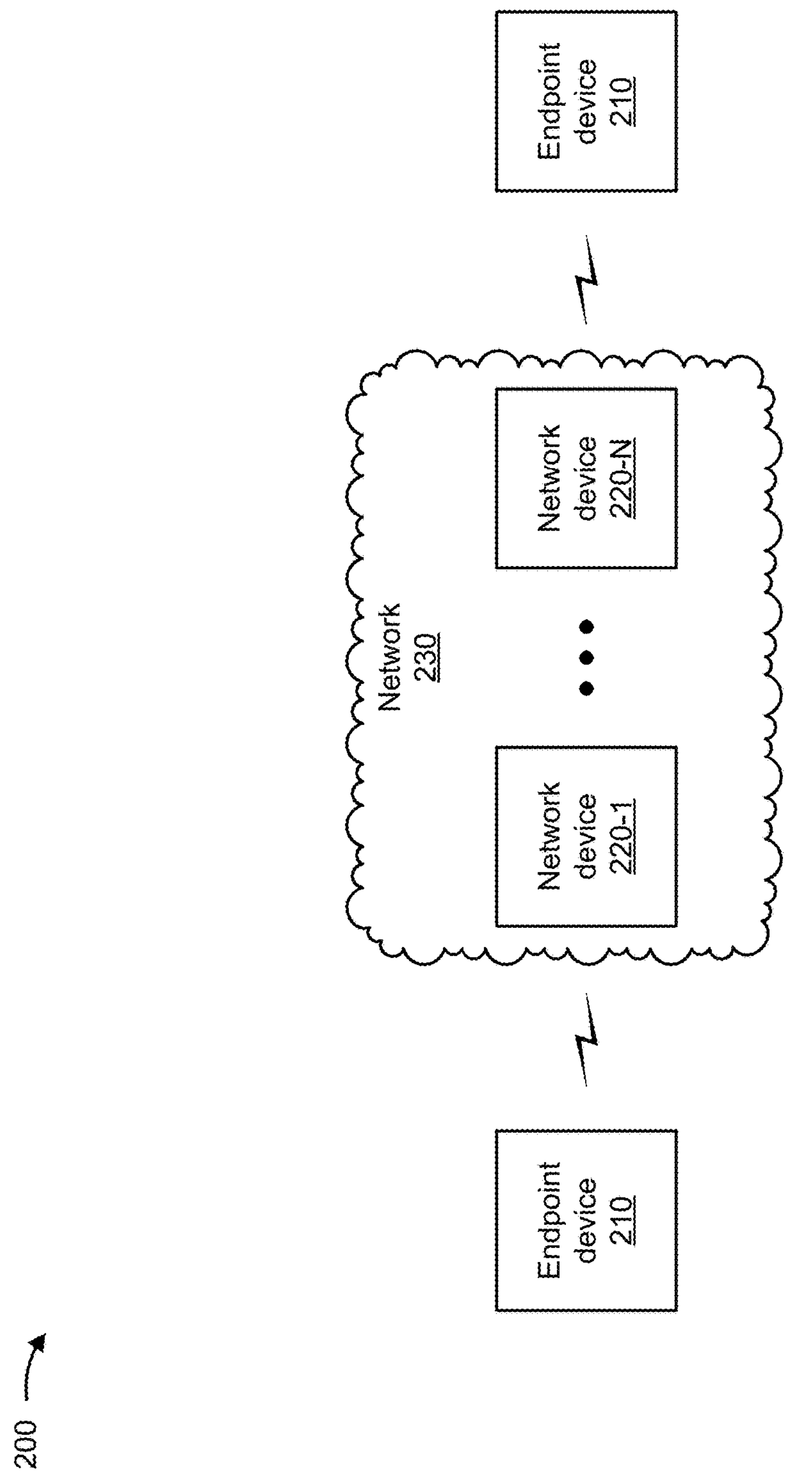
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more endpoint devices 210 (referred to individually as endpoint device 210 or collectively as end point devices 210), a group of network devices 220 (shown as network device 220-1 through network device 220-N), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, or a similar type of device. In some implementations, endpoint device 210 may receive network traffic from and/or may provide network traffic to other endpoint devices 210, via network 230 (e.g., by routing packets using network devices 220 as intermediaries).

Network device 220 includes one or more devices capable of receiving, processing, storing, routing, and/or providing network traffic in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
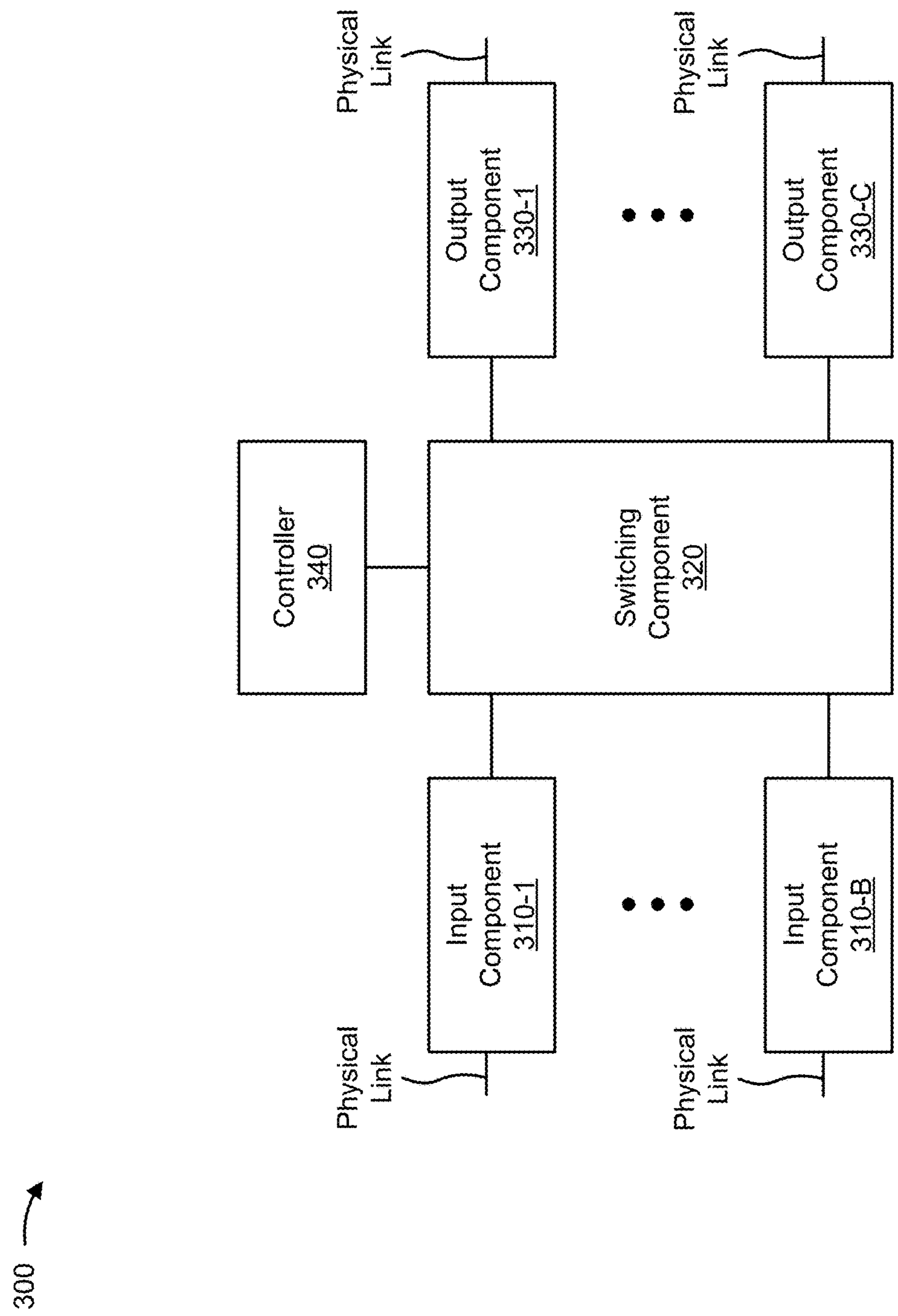
FIG. 3 is a diagram of example components of one or more devices of FIG. 2.

FIG. 3 is a diagram of example components of a device 300. Device 300 may correspond to endpoint device 210, network device 220, and/or the like. In some implementations, endpoint device 210, network device 220, and/or the like may include one or more devices 300 and/or one or more components of device 300. As shown in FIG. 3, device 300 may include one or more input components 310-1 through 310-B (B≥1) (hereinafter referred to collectively as input components 310, and individually as input component 310), a switching component 320, one or more output components 330-1 through 330-C (C≥1) (hereinafter referred to collectively as output components 330, and individually as output component 330), and a controller 340.

Input component 310 may be one or more points of attachment for physical links and may be one or more points of entry for incoming traffic, such as packets. Input component 310 may process incoming traffic, such as by performing data link layer encapsulation or decapsulation. In some implementations, input component 310 may transmit and/or receive packets. In some implementations, input component 310 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 310.

Switching component 320 may interconnect input components 310 with output components 330. In some implementations, switching component 320 may be implemented via one or more crossbars, via busses, and/or with shared memories. The shared memories may act as temporary buffers to store packets from input components 310 before the packets are eventually scheduled for delivery to output components 330. In some implementations, switching component 320 may enable input components 310, output components 330, and/or controller 340 to communicate with one another.

Output component 330 may store packets and may schedule packets for transmission on output physical links. Output component 330 may support data link layer encapsulation or decapsulation, and/or a variety of higher-level protocols. In some implementations, output component 330 may transmit packets and/or receive packets. In some implementations, output component 330 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 330. In some implementations, input component 310 and output component 330 may be implemented by the same set of components (e.g., and input/output component may be a combination of input component 310 and output component 330).

Controller 340 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 340 may include one or more processors that can be programmed to perform a function.

In some implementations, controller 340 may include a random access memory (RAM), a read only memory (ROM), and/or another type of dynamic or static storage device (e.g., a flash memory, a magnetic memory, an optical memory, etc.) that stores information and/or instructions for use by controller 340.

In some implementations, controller 340 may communicate with other devices, networks, and/or systems connected to device 300 to exchange information regarding network topology. Controller 340 may create routing tables based on the network topology information, may create forwarding tables based on the routing tables, and may forward the forwarding tables to input components 310 and/or output components 330. Input components 310 and/or output components 330 may use the forwarding tables to perform route lookups for incoming and/or outgoing packets.

Controller 340 may perform one or more processes described herein. Controller 340 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 340 from another computer-readable medium or from another device via a communication interface. When executed, software instructions stored in a memory and/or storage component associated with controller 340 may cause controller 340 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
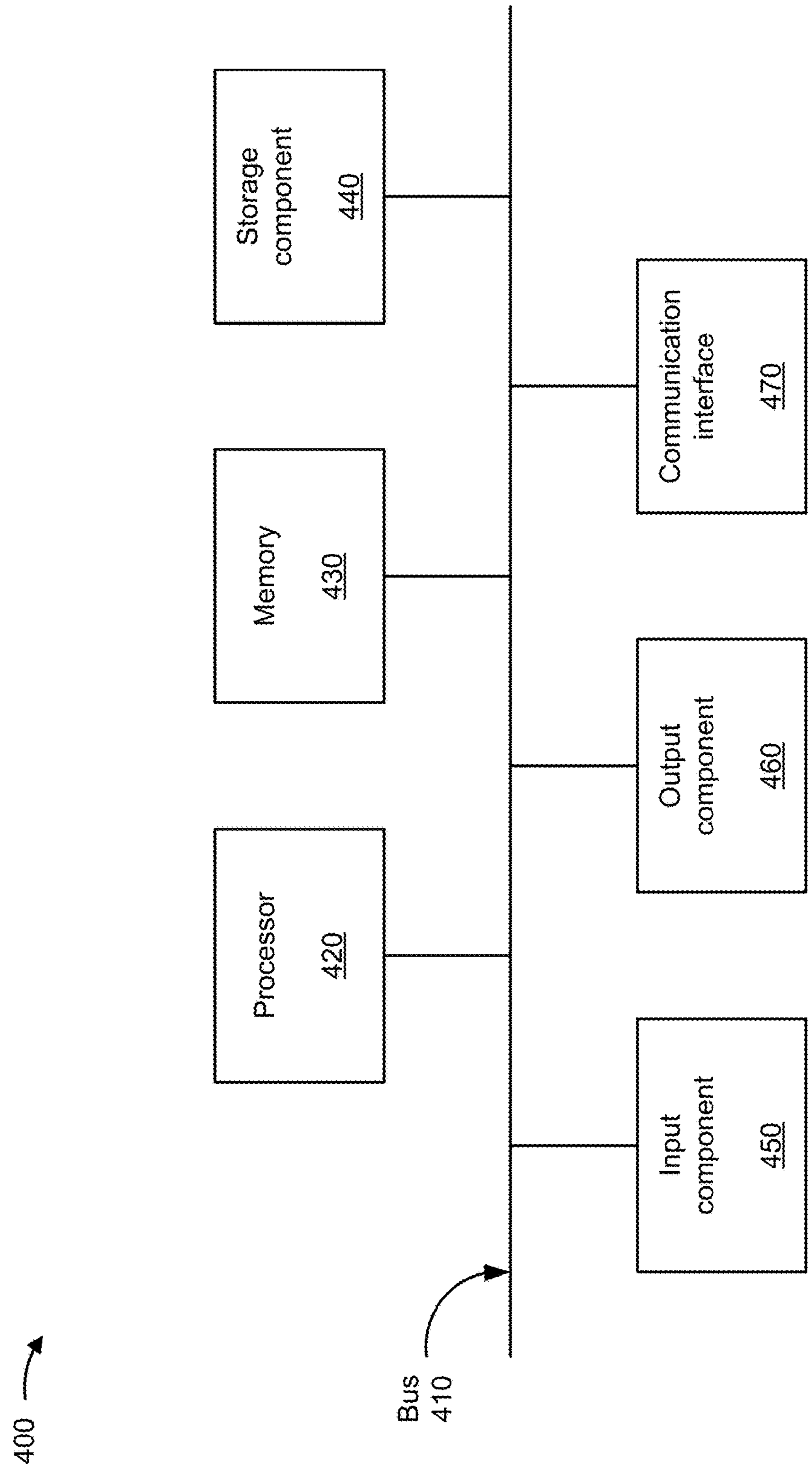
FIG. 4 is a diagram of example components of one or more devices of FIG. 2.

FIG. 4 is a diagram of example components of a device 400. Device 400 may correspond to endpoint device 210, network device 220, and/or the like. In some implementations, endpoint device 210 and/or network device 220, and/or the like may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 takes the form of a CPU, a GPU, an APU, a microprocessor, a microcontroller, a DSP, an FPGA, an ASIC, or another type of processing component. In some implementations, processor 420 includes one or more processors capable of being programmed to perform a function. Memory 430 includes a RAM, a ROM, and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
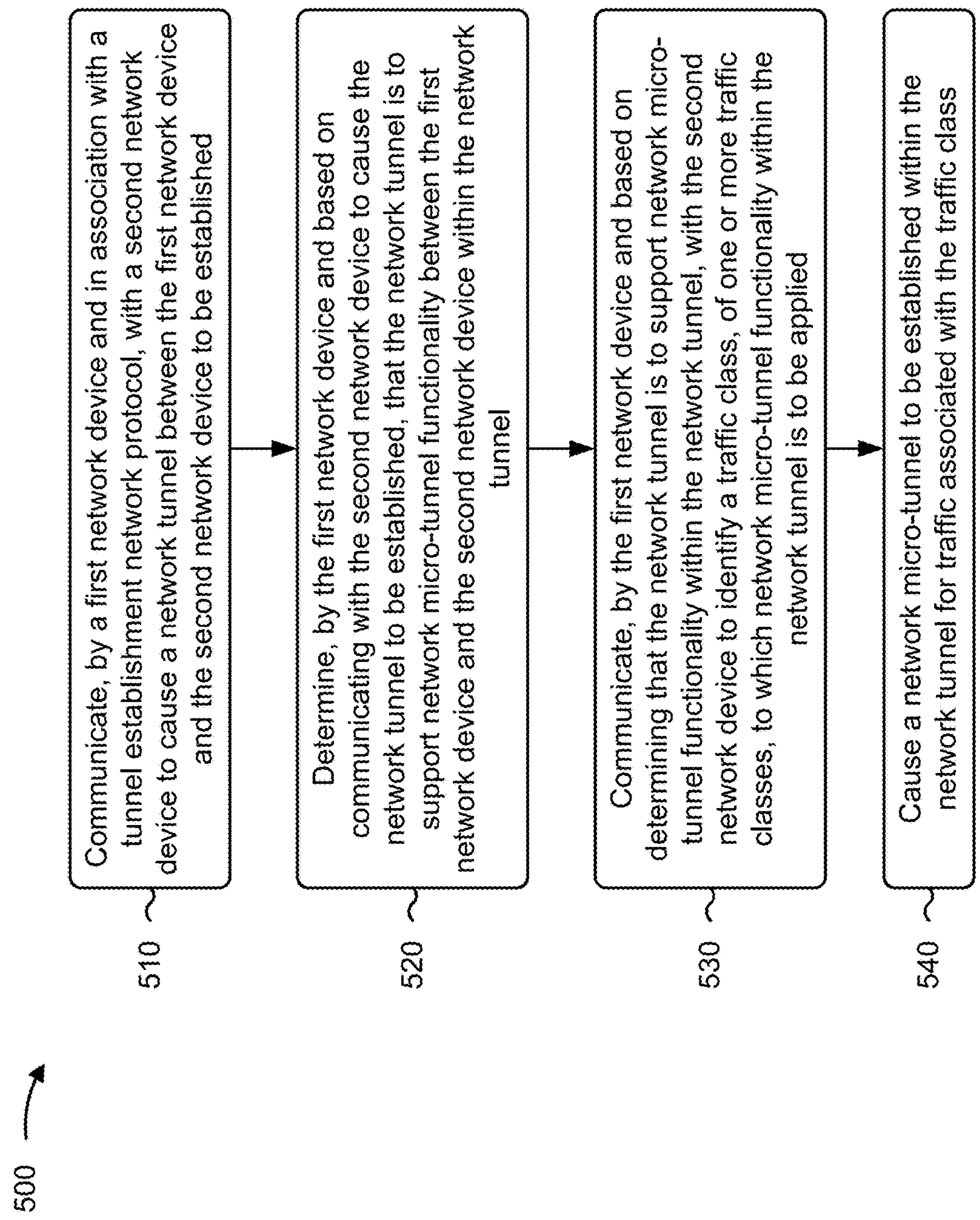
FIGS. 5-7 are flowcharts of one or more example processes associated with establishing a network micro-tunnel within a network tunnel.

FIG. 5 is a flow chart of an example process 500 for establishing a network micro-tunnel within a network tunnel. In some implementations, one or more process blocks of FIG. 5 may be performed by a first network device (e.g., network device 220). In some implementations, one or more process blocks of FIG. 5 may be performed by another device or a group of devices separate from or including the first network device, such as an endpoint device (e.g., endpoint device 210), a server device, and/or the like.

As shown in FIG. 5, process 500 may include communicating, by a first network device and in association with a tunnel establishment network protocol, with a second network device to cause a network tunnel between the first network device and the second network device to be established (block 510). For example, the first network device (e.g., using input component 310, switching component 320, output component 330, controller 340, processor 420, memory 430, storage component 440, input component 450, output component 460, communication interface 470, and/or the like) may communicate, in association with a tunnel establishment network protocol, with a second network device to cause a network tunnel between the first network device and the second network device to be established, as described above.

As further shown in FIG. 5, process 500 may include determining, by the first network device and based on communicating with the second network device to cause the network tunnel to be established, that the network tunnel is to support network micro-tunnel functionality between the first network device and the second network device within the network tunnel (block 520). For example, the first network device (e.g., using input component 310, switching component 320, output component 330, controller 340, processor 420, memory 430, storage component 440, input component 450, output component 460, communication interface 470, and/or the like) may determine, based on communicating with the second network device to cause the network tunnel to be established, that the network tunnel is to support network micro-tunnel functionality between the first network device and the second network device within the network tunnel, as described above.

As further shown in FIG. 5, process 500 may include communicating, by the first network device and based on determining that the network tunnel is to support network micro-tunnel functionality within the network tunnel, with the second network device to identify a traffic class, of one or more traffic classes, to which network micro-tunnel functionality within the network tunnel is to be applied (block 530). For example, the first network device (e.g., using input component 310, switching component 320, output component 330, controller 340, processor 420, memory 430, storage component 440, input component 450, output component 460, communication interface 470, and/or the like) may communicate, based on determining that the network tunnel is to support network micro-tunnel functionality within the network tunnel, with the second network device to identify a traffic class, of one or more traffic classes, to which network micro-tunnel functionality within the network tunnel is to be applied, as described above.

As further shown in FIG. 5, process 500 may include causing a network micro-tunnel to be established within the network tunnel for traffic associated with the traffic class (block 540). For example, the first network device (e.g., using input component 310, switching component 320, output component 330, controller 340, processor 420, memory 430, storage component 440, input component 450, output component 460, communication interface 470, and/or the like) may cause a network micro-tunnel to be established within the network tunnel for traffic associated with the traffic class, as described above.

Process 500 may include additional implementations, such as any single implementation or any combination of implementations described below and/or in connection with one or more other processes described elsewhere herein.

In a first implementation, the tunnel establishment network protocol is an Internet Key Exchange protocol and the network tunnel is a network tunnel that uses Internet Protocol Security protocol security association.

In a second implementation, alone or in combination with the first implementation, the one or more traffic classes includes at least one of: a web traffic class; a voice over Internet protocol traffic class; a control traffic class; a streaming multimedia traffic class; or a file transfer traffic class.

In a third implementation, alone or in combination with one or more of the first and second implementations, determining that the network tunnel is to support network micro-tunnel functionality between the first network device and the second network device within the network tunnel comprises: determining, based on a configuration setting associated with the first network device, that the first network device can support micro-tunnel functionality; receiving, based on communicating with the second network device to cause the network tunnel to be established, a message indicating that the second network device can support micro-tunnel functionality, and determining, based on determining that the first network device can support micro-tunnel functionality and the message indicating that the second network device can support micro-tunnel functionality, that the network tunnel is to support network micro-tunnel functionality between the first network device and the second network device within the network tunnel.

In a fourth implementation, alone or in combination with one or more of the first through third implementations, communicating with the second network device to identify the traffic class that to which network micro-tunnel functionality within the network tunnel is to be applied comprises: determining, based on a configuration setting associated with the first network device, a first set of traffic classes; receiving, from the second network device, a message indicating a second set of traffic classes, and processing the first set of traffic classes and the second set of traffic classes to identify the traffic class to which network micro-tunnel functionality within the network tunnel is to be applied.

In a fifth implementation, alone or in combination with one or more of the first through fourth implementations, causing the network micro-tunnel to be established within the network tunnel for traffic associated with the traffic class comprises: configuring a data structure associated with the network tunnel to initialize a counter associated with the traffic class, the counter is configured to increment a counter identifier based on the first network device receiving or transmitting at least one packet that is associated with the traffic class.

In a sixth implementation, alone or in combination with one or more of the first through fifth implementations, process 500 includes receiving a packet associated with the traffic class that is destined for the second network device; and forwarding the packet associated with the traffic class to the second network device via the network micro-tunnel.

In a seventh implementation, alone or in combination with one or more of the first through sixth implementations, process 500 includes receiving, from the second network device and via the network micro-tunnel, a packet associated with the traffic class that is destined for another device; obtaining, from a data structure associated with the first network device, a counter identifier associated with the traffic class; determining that a sequence identifier associated with the traffic class that is included in the packet corresponds to the counter identifier; and forwarding, based on determining that the sequence identifier included in the packet corresponds to the counter identifier, the packet to the other device.

In an eighth implementation, alone or in combination with one or more of the first through seventh implementations, process 500 includes receiving a first packet associated with the traffic class and a second packet not associated with the traffic class that are destined for the second network device; forwarding the first packet associated with the traffic class to the second network device via the network micro-tunnel; and forwarding the second packet not associated with the traffic class to the second network device via the network tunnel.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
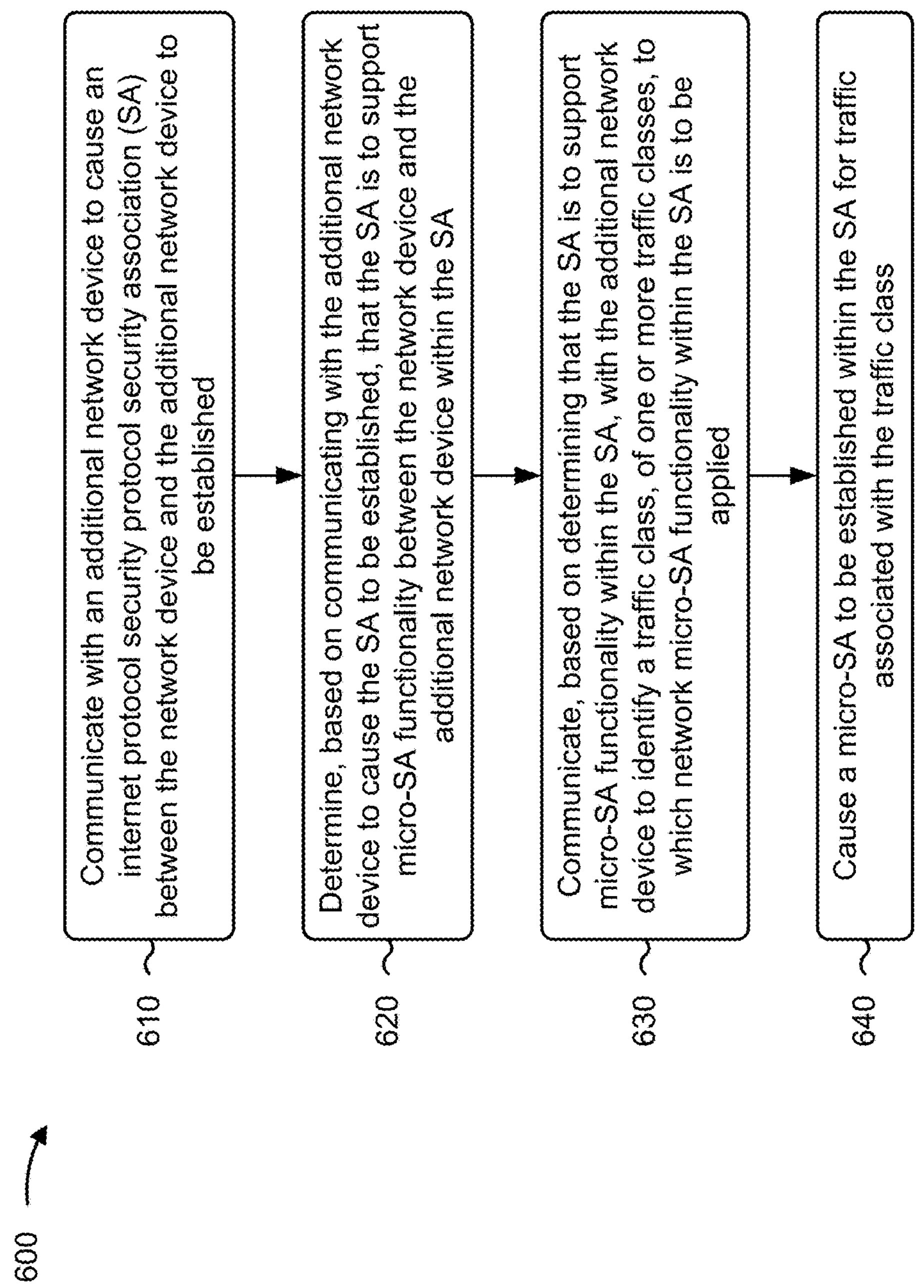

FIG. 6 is a flow chart of an example process 600 for establishing a network micro-tunnel within a network tunnel. In some implementations, one or more process blocks of FIG. 6 may be performed by a network device (e.g., network device 220). In some implementations, one or more process blocks of FIG. 6 may be performed by another device or a group of devices separate from or including the network device, such as an endpoint device (e.g., endpoint device 210), a server device, and/or the like.

As shown in FIG. 6, process 600 may include communicating with an additional network device to cause an Internet Protocol Security protocol security association (SA) between the network device and the additional network device to be established (block 610). For example, the network device (e.g., using input component 310, switching component 320, output component 330, controller 340, processor 420, memory 430, storage component 440, input component 450, output component 460, communication interface 470, and/or the like) may communicate with an additional network device to cause an Internet Protocol Security protocol security association (SA) between the network device and the additional network device to be established, as described above.

As further shown in FIG. 6, process 600 may include determining, based on communicating with the additional network device to cause the SA to be established, that the SA is to support micro-SA functionality between the network device and the additional network device within the SA (block 620). For example, the network device (e.g., using input component 310, switching component 320, output component 330, controller 340, processor 420, memory 430, storage component 440, input component 450, output component 460, communication interface 470, and/or the like) may determine, based on communicating with the additional network device to cause the SA to be established, that the SA is to support micro-SA functionality between the network device and the additional network device within the SA, as described above.

As further shown in FIG. 6, process 600 may include communicating, based on determining that the SA is to support micro-SA functionality within the SA, with the additional network device to identify a traffic class, of one or more traffic classes, to which network micro-SA functionality within the SA is to be applied (block 630). For example, the network device (e.g., using input component 310, switching component 320, output component 330, controller 340, processor 420, memory 430, storage component 440, input component 450, output component 460, communication interface 470, and/or the like) may communicate, based on determining that the SA is to support micro-SA functionality within the SA, with the additional network device to identify a traffic class, of one or more traffic classes, to which network micro-SA functionality within the SA is to be applied, as described above.

As further shown in FIG. 6, process 600 may include causing a micro-SA to be established within the SA for traffic associated with the traffic class (block 640). For example, the network device (e.g., using input component 310, switching component 320, output component 330, controller 340, processor 420, memory 430, storage component 440, input component 450, output component 460, communication interface 470, and/or the like) may cause a micro-SA to be established within the SA for traffic associated with the traffic class, as described above.

Process 600 may include additional implementations, such as any single implementation or any combination of implementations described below and/or in connection with one or more other processes described elsewhere herein.

In a first implementation, a particular traffic class, of the one or more traffic classes, is associated with at least one of: information indicating a differentiated services code point; information indicating a traffic application identifier; information indicating a traffic origination address; information indicating a traffic destination address; information indicating a domain name system; or information indicating a server name indication.

In a second implementation, alone or in combination with the first implementation, communicating with the additional network device to identify the traffic class to which network micro-SA functionality within the SA is to be applied comprises: determining, based on a configuration setting associated with the network device, a first set of traffic classes that could use network micro-tunnel functionality within the SA; identifying a second set of traffic classes that could use network micro-tunnel functionality within the SA, wherein the first is setting of traffic classes and the second set of traffic classes respectively include the traffic class to which network micro-SA functionality within the SA is to be applied; and comparing the first set of traffic classes and the second set of traffic classes to identify the traffic class to which network micro-SA functionality within the SA is to be applied.

In a third implementation, alone or in combination with one or more of the first and second implementations, causing the micro-SA to be established within the SA for traffic associated with the traffic class comprises: generating a data structure associated with the SA; and causing the data structure to include a counter associated with the traffic class, wherein the counter is being configured to increment a counter identifier based on the network device receiving or transmitting at least one packet that is associated with the traffic class.

In a fourth implementation, alone or in combination with one or more of the first through third implementations, process 600 includes receiving a packet associated with the traffic class that is destined for the additional network device; encrypt the packet in accordance with an encryption policy is associating with the SA; modifying a header of the encrypted packet to include a sequence identifier associated with the traffic class; and sending, after modifying the header of the encrypted packet, the encrypted packet to the additional network device via the micro-SA.

In a fifth implementation, alone or in combination with one or more of the first through fourth implementations, process 600 includes receiving, from the additional network device and via the micro-SA, an encrypted packet associated with the traffic class that is destined for another device; identifying a sequence identifier associated with the traffic class that is included in the encrypted packet; determining that the sequence identifier corresponds to a counter identifier associated with the traffic class; decrypt, is basing on determining that the sequence identifier corresponds to the counter identifier associated with the traffic class, the encrypted packet in accordance with an encryption policy associated with the SA; and sending the decrypted packet to the other device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
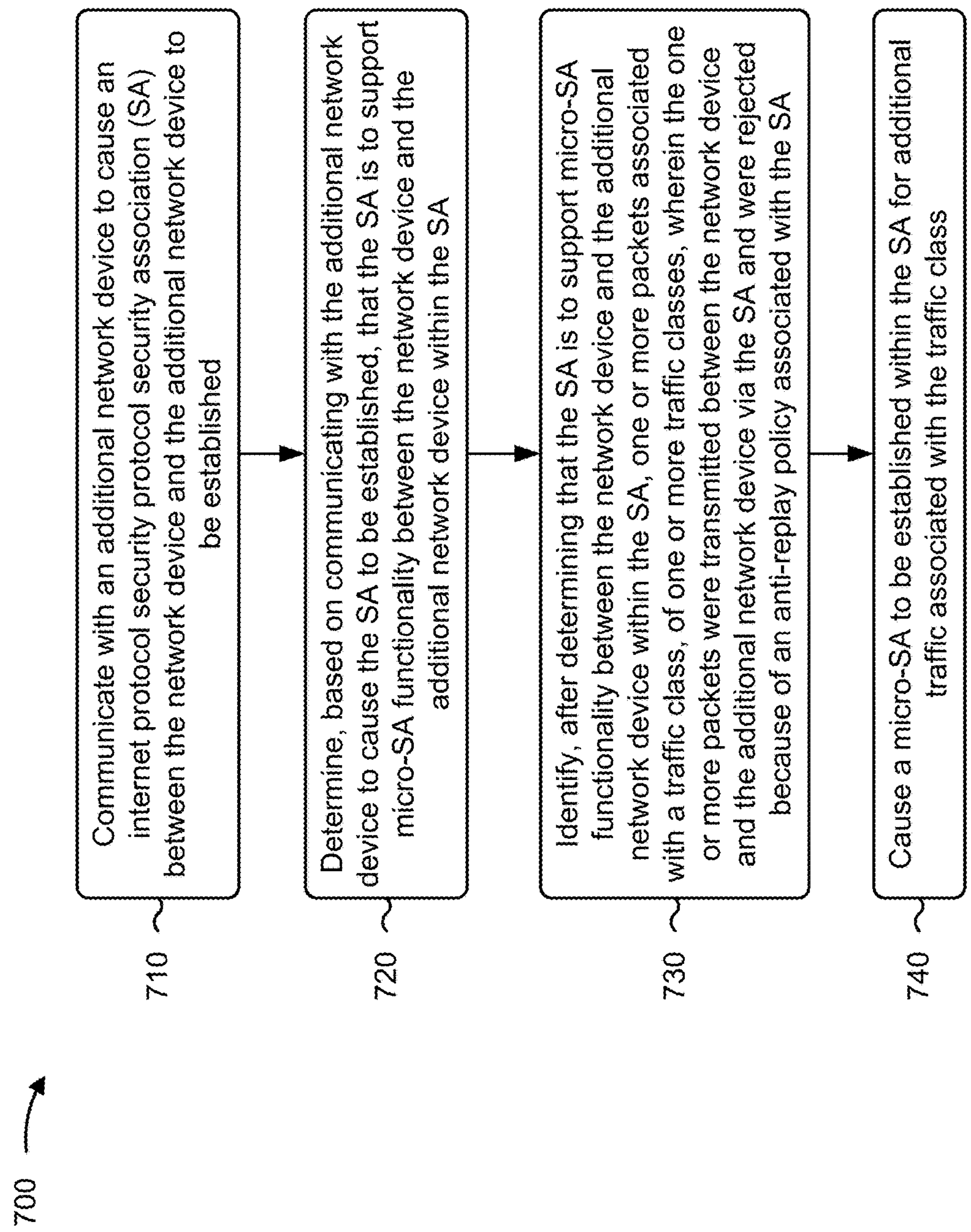

FIG. 7 is a flow chart of an example process 700 for establishing a network micro-tunnel within a network tunnel. In some implementations, one or more process blocks of FIG. 7 may be performed by a network device (e.g., network device 220). In some implementations, one or more process blocks of FIG. 7 may be performed by another device or a group of devices separate from or including the network device, such as an endpoint device (e.g., endpoint device 210), a server device, and/or the like.

As shown in FIG. 7, process 700 may include communicating with an additional network device to cause an Internet Protocol Security protocol security association (SA) between the network device and the additional network device to be established (block 710). For example, the network device (e.g., using input component 310, switching component 320, output component 330, controller 340, processor 420, memory 430, storage component 440, input component 450, output component 460, communication interface 470, and/or the like) may communicate with an additional network device to cause an Internet Protocol Security protocol security association (SA) between the network device and the additional network device to be established, as described above.

As further shown in FIG. 7, process 700 may include determining, based on communicating with the additional network device to cause the SA to be established, that the SA is to support micro-SA functionality between the network device and the additional network device within the SA (block 720). For example, the network device (e.g., using input component 310, switching component 320, output component 330, controller 340, processor 420, memory 430, storage component 440, input component 450, output component 460, communication interface 470, and/or the like) may determine, based on communicating with the additional network device to cause the SA to be established, that the SA is to support micro-SA functionality between the network device and the additional network device within the SA, as described above.

As further shown in FIG. 7, process 700 may include identifying, after determining that the SA is to support micro-SA functionality between the network device and the additional network device within the SA, one or more packets associated with a traffic class, of one or more traffic classes, wherein the one or more packets were transmitted between the network device and the additional network device via the SA and were rejected because of an anti-replay policy associated with the SA (block 730). For example, the network device (e.g., using input component 310, switching component 320, output component 330, controller 340, processor 420, memory 430, storage component 440, input component 450, output component 460, communication interface 470, and/or the like) may identify, after determining that the SA is to support micro-SA functionality between the network device and the additional network device within the SA, one or more packets associated with a traffic class, of one or more traffic classes, as described above. In some implementations, the one or more packets were transmitted between the network device and the additional network device via the SA and were rejected because of an anti-replay policy associated with the SA.

As further shown in FIG. 7, process 700 may include causing a micro-SA to be established within the SA for additional traffic associated with the traffic class (block 740). For example, the network device (e.g., using input component 310, switching component 320, output component 330, controller 340, processor 420, memory 430, storage component 440, input component 450, output component 460, communication interface 470, and/or the like) may cause a micro-SA to be established within the SA for additional traffic associated with the traffic class, as described above.

Process 700 may include additional implementations, such as any single implementation or any combination of implementations described below and/or in connection with one or more other processes described elsewhere herein.

In a first implementation, process 700 includes receiving, after causing the micro-SA to be established within the SA, a packet associated with the traffic class that is destined for the additional network device; determining, based on at least one field of a header of the packet, that the packet is associated with the traffic class; encrypting, after is determining that packet is associated with the traffic class, the packet in accordance with an encryption policy associated with the SA; encapsulating the encrypted packet with an additional header that includes a sequence identifier associated with the traffic class; and sending, after encapsulating the encrypted packet with the additional header, the encrypted packet to the additional network device via the micro-SA.

In a second implementation, alone or in combination with the first implementation, the additional header is an authentication header or an encapsulating security payload header.

In a third implementation, alone or in combination with one or more of the first and second implementations, process 700 includes receiving, after causing the micro-SA to be established within the SA, from the additional network device and via the micro-SA, an encrypted packet associated with the traffic class that is destined for another device; identifying a sequence identifier associated with the traffic class that is included in a header of the encrypted packet; determining that the sequence identifier corresponds to a counter identifier associated with the traffic class; decrypting, is basing on determining that the sequence identifier corresponds to the counter identifier associated with the traffic class, the encrypted packet in accordance with an encryption policy associated with the SA; and sending the decrypted packet to the other device.

In a fourth implementation, alone or in combination with one or more of the first through third implementations, process 700 includes receiving, after causing the micro-SA to be established within the SA, a first packet associated with the traffic class and a second packet not associated with the traffic class, wherein the first packet and the second packet is being destined for the additional network device; determining, based on at least one field of a header of the first packet, that the first packet is associated with the traffic class; determining, based on at least one field of a header of the second packet, that the second packet is not associated with the traffic class; sending, based on determining that the first packet is associated with the traffic class, the first packet to the additional network device via the micro-SA; and sending, based on determining that the second packet is not associated with the traffic class, the second packet to the additional network device via the SA.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, the term network traffic may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

determining, by a first network device and based on communicating with a second network device to cause a network tunnel to be established, that the network tunnel is to support network micro-tunnel functionality between the first network device and the second network device within the network tunnel;

communicating, by the first network device and based on determining that the network tunnel is to support the network micro-tunnel functionality within the network tunnel, with the second network device to identify a traffic class, of one or more traffic classes, to which the network micro-tunnel functionality is to be applied; and causing, by the first network device, a network micro-tunnel to be established within the network tunnel for traffic associated with the traffic class, wherein the traffic associated with the traffic class is communicated via the network micro-tunnel.

2. The method of claim 1, further comprising:

sending a first message including information indicating a first set of traffic classes associated with the micro-tunnel functionality;

receiving a second message including information indicating a second set of traffic classes associated with the micro-tunnel functionality; and identifying the traffic class based on analyzing information associated with the first set of traffic classes and information associated with the second set of traffic classes.

3. The method of claim 1, wherein causing the network micro-tunnel to be established comprises:

configuring a data structure associated with the network tunnel to initialize a counter associated with the traffic class, wherein the counter is configured to increment a counter identifier based on network traffic associated with the traffic class related to the first network device.

4. The method of claim 1, wherein determining that the network tunnel is to support network micro-tunnel functionality comprises:

determining, based on configuration information associated with the first network device, that the first network device can support the micro-tunnel functionality;

receiving a message indicating that the second network device can support the micro-tunnel functionality; and determining, based on determining that the first network device can support the micro-tunnel functionality, and based on the message, that the network tunnel is to support the micro-tunnel functionality between the first network device and the second network device.

5. The method of claim 1, further comprising:

receiving a packet associated with the traffic class that is destined for another device;

obtaining, from a data structure associated with the first network device, a counter identifier associated with the traffic class;

determining that a sequence identifier associated with the traffic class that is included in the packet corresponds to the counter identifier; and forwarding, based on determining that the sequence identifier included in the packet corresponds to the counter identifier, the packet to the other device.

6. The method of claim 1, further comprising:

receiving a first packet associated with the traffic class;

receiving a second packet associated with a different traffic class;

transmitting the first packet to the second network device via the network micro-tunnel; and transmitting the second packet to the second network device via the network tunnel.

7. The method of claim 1, wherein the network tunnel uses an Internet Protocol Security protocol security association (SA) between the first network device and the second network device, and wherein the micro-tunnel functionality is micro-SA functionality.

8. A first network device, comprising:

one or more memories; and one or more processors to:

determine, based on communicating with a second network device to cause a network tunnel to be established, that the network tunnel is to support network micro-tunnel functionality between the first network device and the second network device within the network tunnel;

communicate, based on determining that the network tunnel is to support the network micro-tunnel functionality within the network tunnel, with the second network device to identify a traffic class, of one or more traffic classes, to which the network micro-tunnel functionality is to be applied; and cause a network micro-tunnel to be established within the network tunnel for traffic associated with the traffic class, wherein the traffic associated with the traffic class is communicated via the network micro-tunnel.

9. The first network device of claim 8, wherein the one or more processors are further to:

send a first message including information indicating a first set of traffic classes associated with the micro-tunnel functionality;

receive a second message including information indicating a second set of traffic classes associated with the micro-tunnel functionality; and identify the traffic class based on analyzing information associated with the first set of traffic classes and information associated with the second set of traffic classes.

10. The first network device of claim 8, wherein the one or more processors, to cause the network micro-tunnel to be established, are to:

configure a data structure associated with the network tunnel to initialize a counter associated with the traffic class, wherein the counter is configured to increment a counter identifier based on network traffic associated with the traffic class related to the first network device.

11. The first network device of claim 8, wherein the one or more processors, to determine that the network tunnel is to support network micro-tunnel functionality, are to:

determine, based on configuration information associated with the first network device, that the first network device can support the micro-tunnel functionality;

receive a message indicating that the second network device can support the micro-tunnel functionality; and determine, based on determining that the first network device can support the micro-tunnel functionality, and based on the message, that the network tunnel is to support the micro-tunnel functionality between the first network device and the second network device.

12. The first network device of claim 8, wherein the one or more processors are further to:

receive a packet associated with the traffic class that is destined for another device;

obtain, from a data structure associated with the first network device, a counter identifier associated with the traffic class;

determine that a sequence identifier associated with the traffic class that is included in the packet corresponds to the counter identifier; and forward, based on determining that the sequence identifier included in the packet corresponds to the counter identifier, the packet to the other device.

13. The first network device of claim 8, wherein the one or more processors are further to:

receive a first packet associated with the traffic class;

receive a second packet associated with a different traffic class;

transmit the first packet to the second network device via the network micro-tunnel; and transmit the second packet to the second network device via the network tunnel.

14. The first network device of claim 8, wherein the network tunnel uses an Internet Protocol Security protocol security association (SA) between the first network device and the second network device, and wherein the micro-tunnel functionality is micro-SA functionality.

15. A non-transitory computer-readable medium storing a set of instructions, the set of instructions comprising:

one or more instructions that, when executed by one or more processors of a first network device, cause the first network device to:

determine, based on communicating with a second network device to cause a network tunnel to be established, that the network tunnel is to support network micro-tunnel functionality between the first network device and the second network device within the network tunnel;

communicate, based on determining that the network tunnel is to support the network micro-tunnel functionality within the network tunnel, with the second network device to identify a traffic class, of one or more traffic classes, to which the network micro-tunnel functionality is to be applied; and cause a network micro-tunnel to be established within the network tunnel for traffic associated with the traffic class, wherein the traffic associated with the traffic class is communicated via the network micro-tunnel.

16. The non-transitory computer-readable medium of claim 15, wherein the one or more instructions further cause the first network device to:

send a first message including information indicating a first set of traffic classes associated with the micro-tunnel functionality;

receive a second message including information indicating a second set of traffic classes associated with the micro-tunnel functionality; and identify the traffic class based on analyzing information associated with the first set of traffic classes and information associated with the second set of traffic classes.

17. The non-transitory computer-readable medium of claim 15, wherein the one or more instructions, that cause the first network device to cause the network micro-tunnel to be established, cause the first network device to:

configure a data structure associated with the network tunnel to initialize a counter associated with the traffic class, wherein the one or more instructions further cause the first network device to increment a counter identifier based on network traffic associated with the traffic class related to the first network device.

18. The non-transitory computer-readable medium of claim 15, wherein the one or more instructions, that cause the first network device to determine that the network tunnel is to support network micro-tunnel functionality, cause the first network device to:

determine, based on configuration information associated with the first network device, that the first network device can support the micro-tunnel functionality;

receive a message indicating that the second network device can support the micro-tunnel functionality; and determine, based on determining that the first network device can support the micro-tunnel functionality, and based on the message, that the network tunnel is to support the micro-tunnel functionality between the first network device and the second network device.

19. The non-transitory computer-readable medium of claim 15, wherein the one or more instructions further cause the first network device to:

receive a packet associated with the traffic class that is destined for another device;

obtain, from a data structure associated with the first network device, a counter identifier associated with the traffic class;

determine that a sequence identifier associated with the traffic class that is included in the packet corresponds to the counter identifier; and forward, based on determining that the sequence identifier included in the packet corresponds to the counter identifier, the packet to the other device.

20. The non-transitory computer-readable medium of claim 15, wherein the one or more instructions further cause the first network device to:

receive a first packet associated with the traffic class;

receive a second packet associated with a different traffic class;

transmit the first packet to the second network device via the network micro-tunnel; and transmit the second packet to the second network device via the network tunnel.

* * * * *